March 4, 1941.   W. D. FOSTER ET AL   2,233,409
MEANS FOR HANDLING FILM
Filed April 21, 1933   9 Sheets-Sheet 1
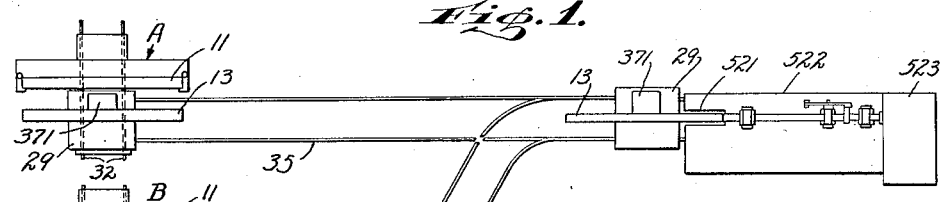
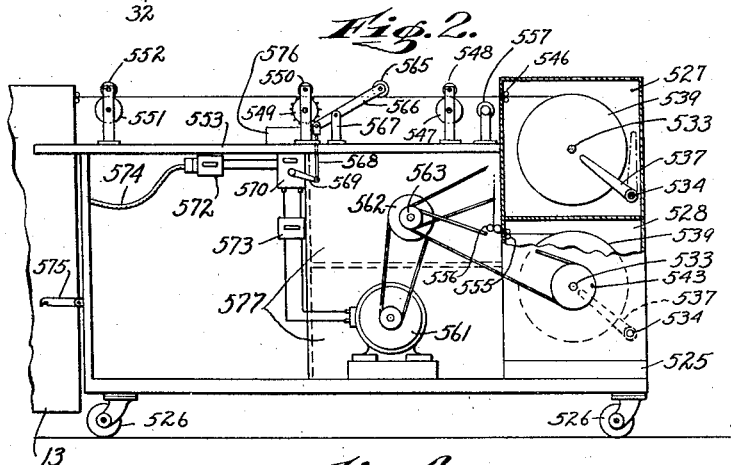
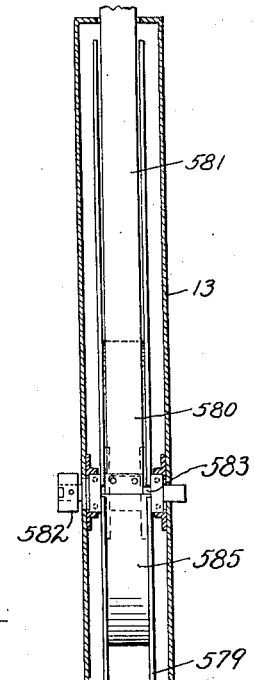
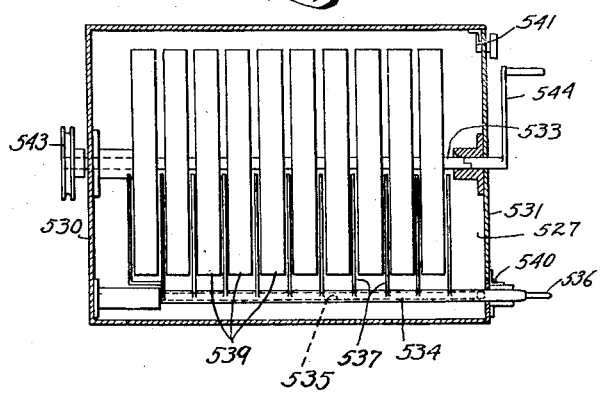
INVENTORS
WARREN DUNHAM FOSTER.
FREDERICK DAVENPORT SWEET.
BY
ATTORNEY

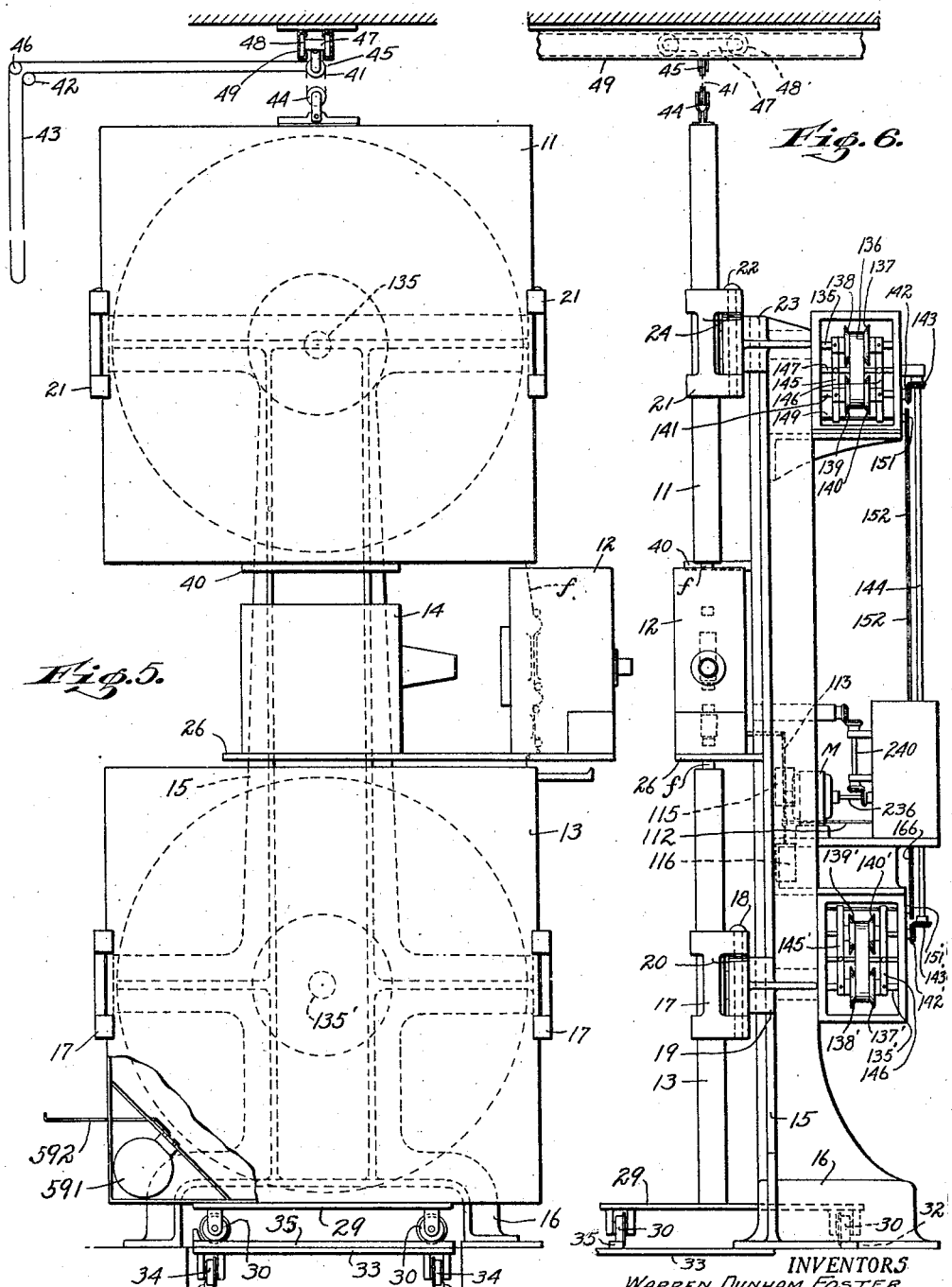

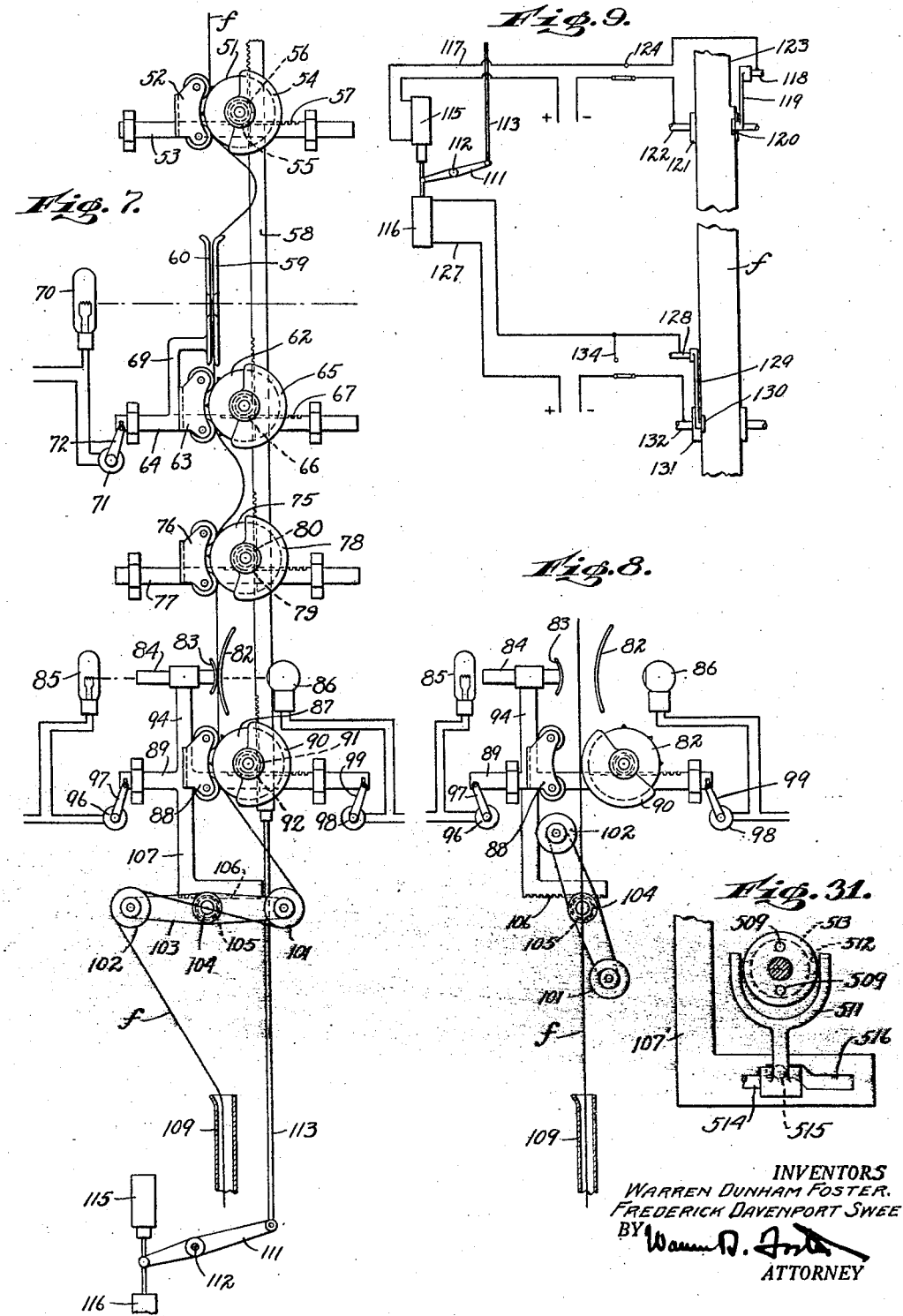

March 4, 1941.    W. D. FOSTER ET AL    2,233,409
MEANS FOR HANDLING FILM
Filed April 21, 1933    9 Sheets-Sheet 4
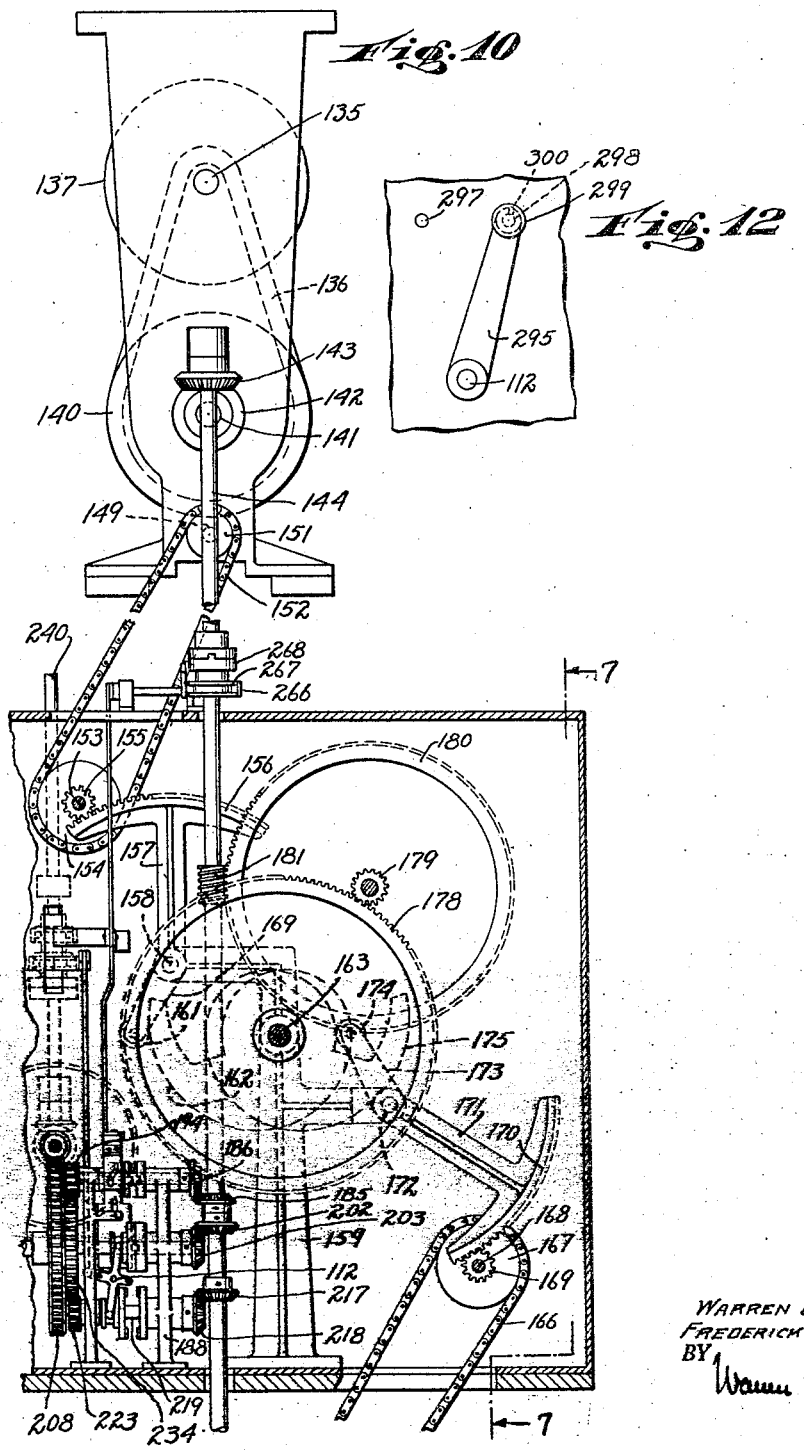
INVENTORS
WARREN DUNHAM FOSTER.
FREDERICK DAVENPORT SWEET.
BY
ATTORNEY.

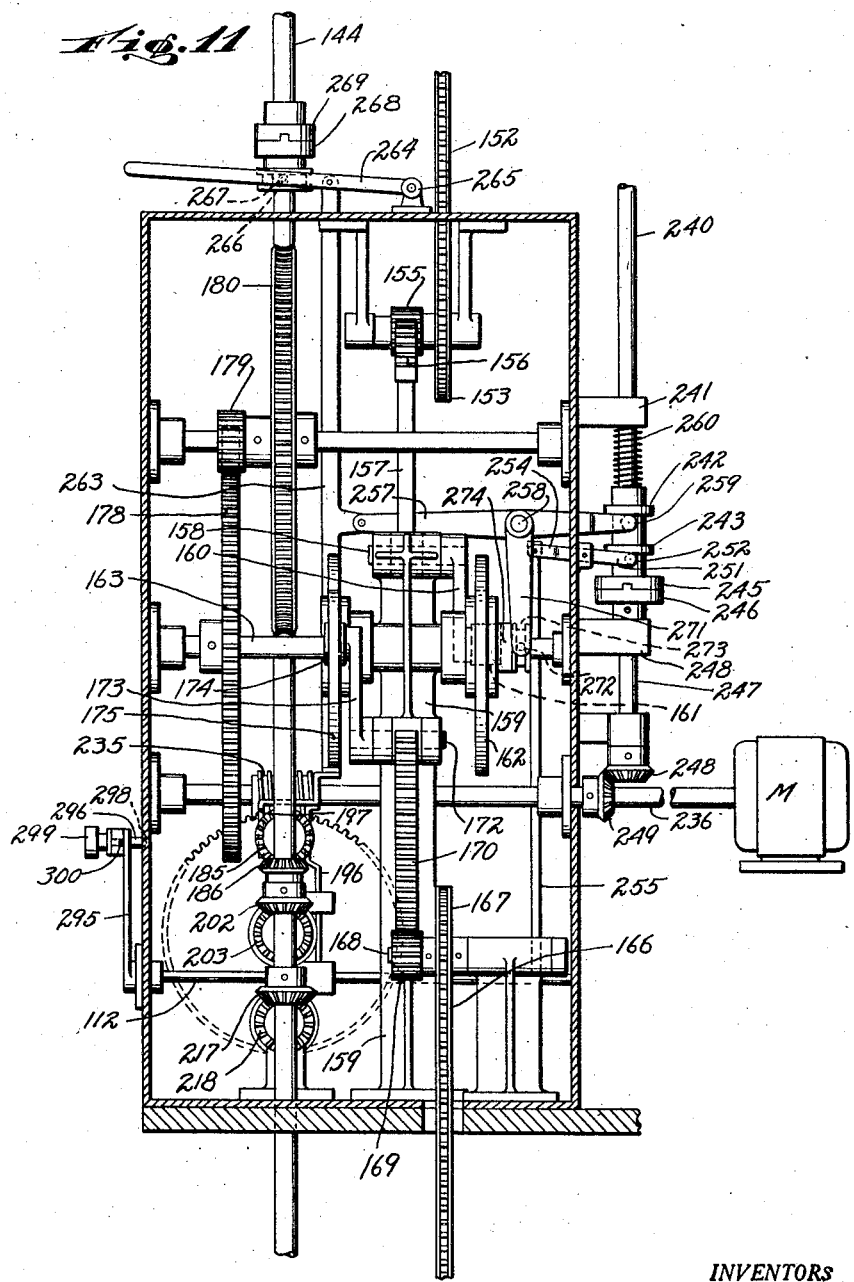

March 4, 1941.    W. D. FOSTER ET AL    2,233,409
MEANS FOR HANDLING FILM
Filed April 21, 1933    9 Sheets-Sheet 6
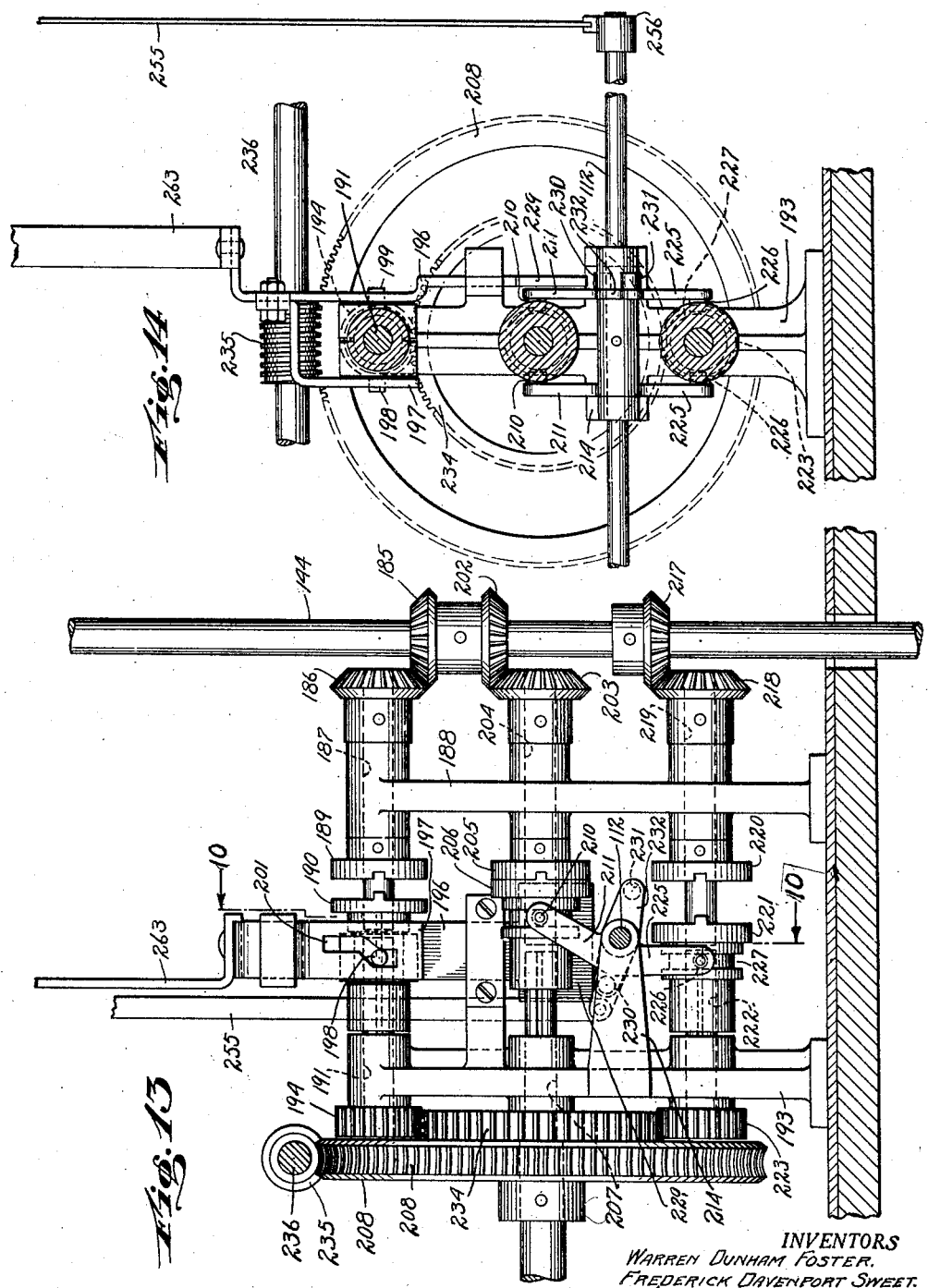
INVENTORS
WARREN DUNHAM FOSTER.
FREDERICK DAVENPORT SWEET.
BY 
ATTORNEY.

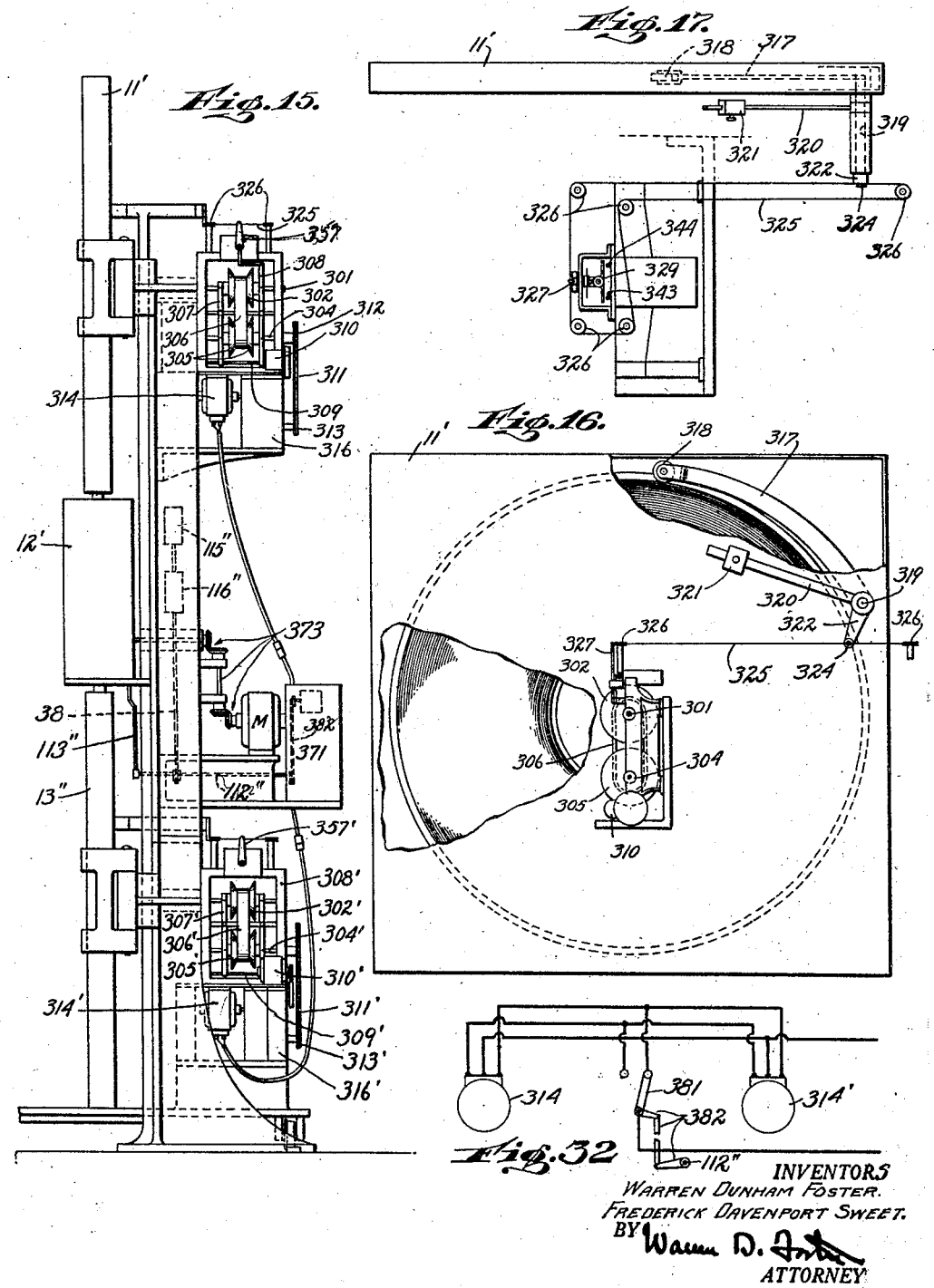

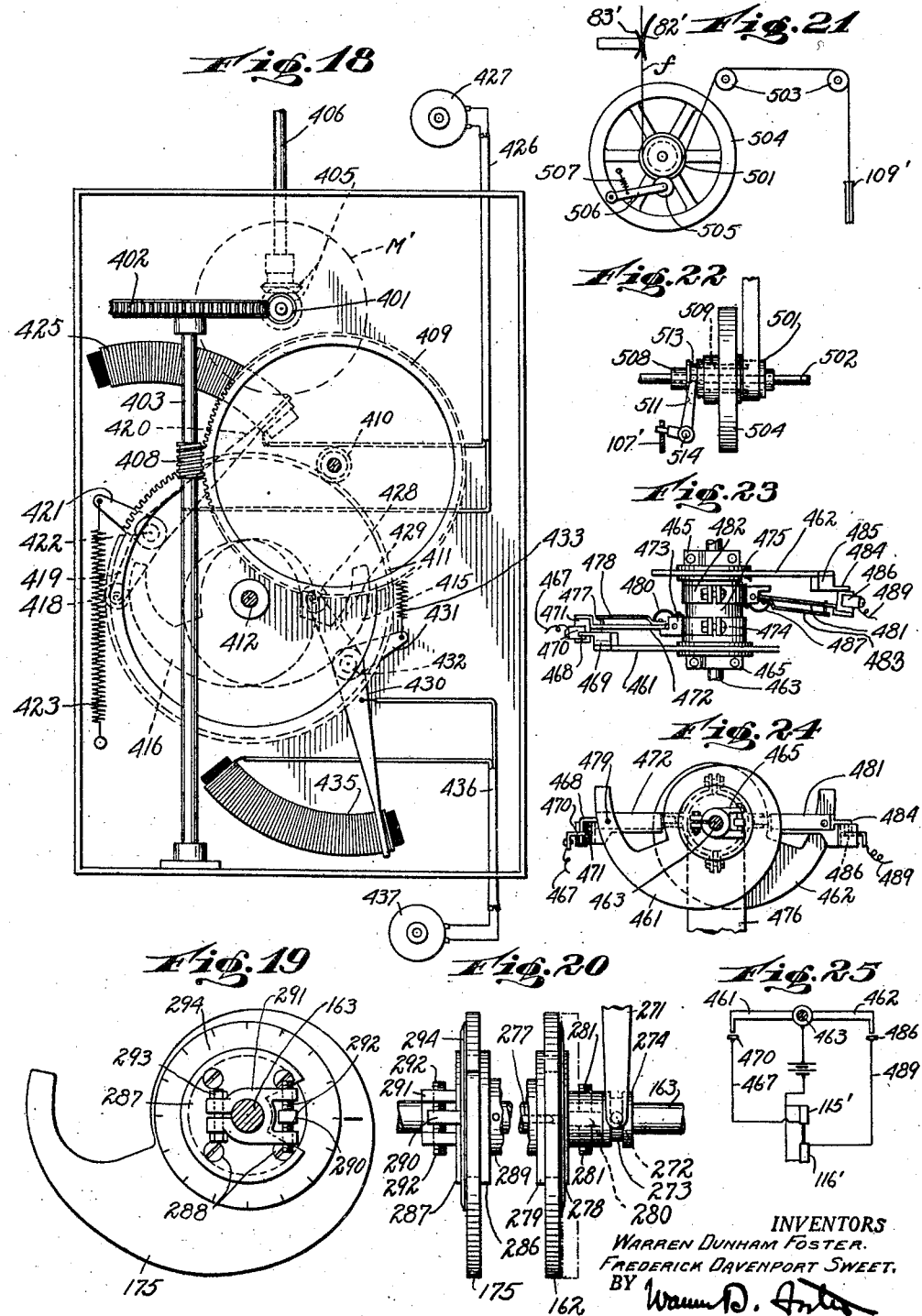

March 4, 1941.  W. D. FOSTER ET AL  2,233,409
MEANS FOR HANDLING FILM
Filed April 21, 1933  9 Sheets-Sheet 9
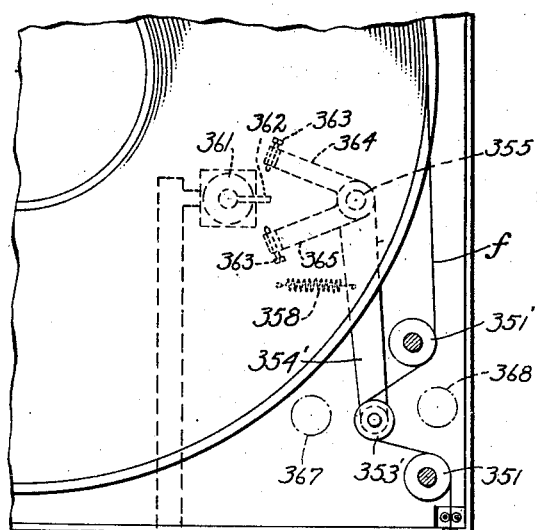
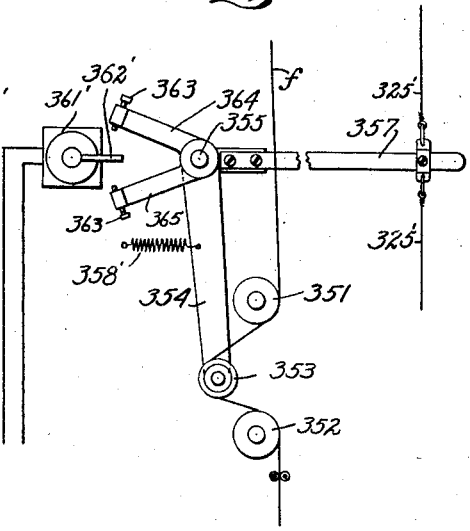
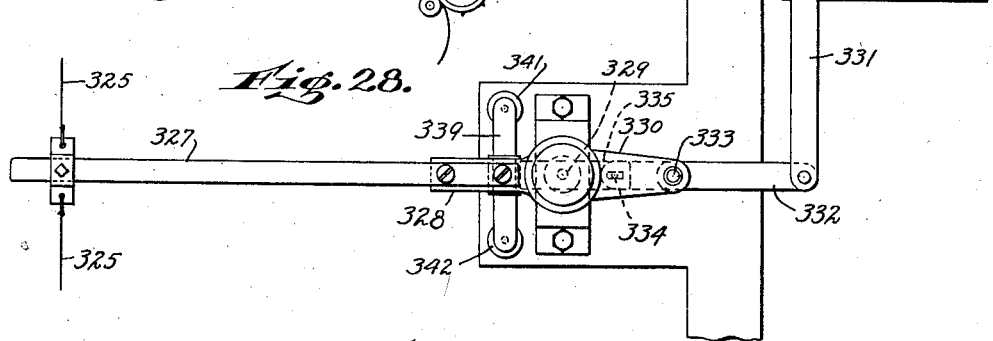
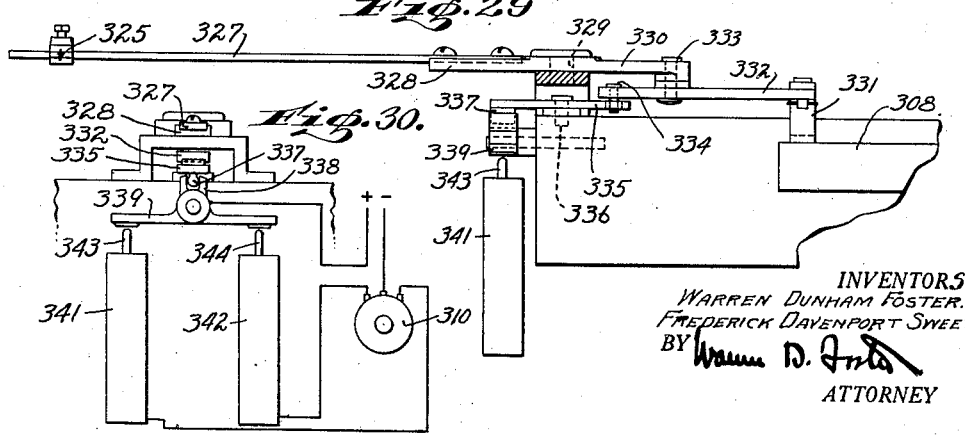
INVENTORS
WARREN DUNHAM FOSTER.
FREDERICK DAVENPORT SWEET.
BY
ATTORNEY Patented Mar. 4, 1941

2,233,409

UNITED STATES PATENT OFFICE 2,233,409

MEANS FOR HANDLING FILM

Warren Dunham Foster, Washington, N. J., and Frederick Davenport Sweet, New York, N. Y., assignors, by direct and mesne assignments, to Kinatome Patents Corporation, Ridgewood, N. J., a corporation of New York Application April 21, 1933, Serial No. 667,174

16 Claims. (Cl. 88—17)

The present invention relates broadly to the handling of film and more particularly to means for projecting or photographing motion pictures with or without provision for the reproduction of sound.

A chief object of the present invention is to provide method and means whereby an entire program of motion pictures may be projected and re-projected, together with the accompanying sound, with a great decrease in the danger of fire and damage to the film and with the expenditure of a minimum of skilled labor.

According to standard practice in motion picture theatres, a battery of projecting machines is installed in a fire proof booth. The operator places a reel of film, generally of 1,000 feet in length, although occasionally of 2,000 feet, by hand upon the delivery spindle of one machine, by hand reels off a sufficient length of loose film to extend through the machine, and threads it through the projecting and sound heads and manually attaches the leading end to the take-up reel. While this film is being projected, the operator who has threaded it, or more usually an associate, similarly threads another film in another machine and at the conclusion of the showing of the first film manually or semi-automatically "changes over" from the one machine to the other, that is to say, starts the second machine before the first machine has run off the last portion of the first reel. This operation, if skillfully carried out, as it often is not, results in no break upon the screen which is apparent to the uncritical members of the audience. Thereupon the first film, which has just been projected, is rewound, generally within the booth itself, in preparation for later use, and a third reel is taken out of its case and manually fitted to the first machine in preparation to the conclusion of the operation of the second machine which is at this time showing the second reel. This process is repeated until the films making up the entire program have been run off and then of course it is duplicated in succeeding programs, often with intermissions of music or vaudeville. It will thus be seen that while the theatre is filled and the performance actually going on, reels of highly inflammable film are being continually handled for threading and rewinding within the booth and adjacent the lamp houses, which always generate great heat, and are particularly dangerous if of the carbon type with the hot carbon stubs, which since they must be removed from the machines while still hot, have caused many fires. The construction of the motion picture projecting machines has been so highly developed and so many safeguards have been built into them that there is now relatively little danger of fire occurring in the film while it is in the machine and practically no danger of that fire spreading because of the many automatic safeguards which are used. The real danger, however, lies in the handling of the film outside of the machine and as it is being placed in the machine, removed therefrom, rewound outside of the machine, or handled for other purposes. It is this danger that the use of our method and apparatus completely eliminates. The use of our method and means also greatly reduces the skill and effort required by the operator, and the number of operators required and results in a better presentation.

To carry out our invention, we supply a machine of large size and capacity, if desired, of sufficient size, automatically to handle an entire program. The apparatus which we describe in order to illustrate the invention is designed to accommodate 20,000 feet of film, which at the present rate of projection of ninety feet per minute, gives an entertainment of three hours and forty-two minutes, which is much longer than those usually presented. We are not limited to this size however.

Prior to projection, through the use of a novel loading machine, we place the entire program in one machine, preferably upon the take-up carrier, and then automatically rewind it back through the projector onto the delivery carrier. During the loading process, the operator inspects each reel and fastens the leading end of each successive reel to the trailing end of its predecessor. The individual thousand foot reels ordinarily come from the film exchange with the loading end outward. According to present practice, the operator inspects each reel before use, this operation making it necessary to wind and rewind each reel. Our plan of loading does away with one of these manual operations and simplifies the other, as will later appear. Thus the original loading—which is the only loading—of the machine really takes no additional time.

During the projection operation, we positively drive both the delivery and the take-up carriers in such manner that the lineal speed of all parts of the film, except the short section being moved by the intermittent, is maintained at exactly a predetermined rate throughout the entire feeding operation, as, for example, the current conventional rate of 90 feet per minute. At no time is any considerable tractive effort put upon the film itself. According to certain exemplifications of the invention no reel at any time is pulled by the film. At the conclusion of the showing of the entire program, or any earlier point, if desired, the entire mass of film is automatically rewound through the same projector without removal therefrom and without strain upon the film. This rewinding operation is likewise carried out at a predetermined and constant rate of speed. During rewinding, a second machine, if desired, may be employed to reproduce music, as, for example, an overture, and to show the usual "trailers" which for advertising purposes present extracts from future attractions. Or a phonograph may be employed during the film rewinding operation. Or, if desired, an entire battery of our machines may be used with or without automatic "change overs" therebetween. A very important feature of our method and means consists in the manner in which we originally load the carrier and unload it at the conclusion of the program. From the foregoing portion of this description, it will of course be understood that according to our method only one loading and unloading of any program is required during the entire period in which that program is in use—a day, or more often three days, or an entire week or more. According to one exemplification of our invention, we make one or both magazines readily detachable from the projecting and sound heads of the machine and furnish tracks upon which these magazines, without being opened, may be run into an adjoining room which is provided with special means, later described in detail, which may be used by the operator semi-automatically to load or unload the magazine. According to another preferred exemplification of our invention, we provide a readily movable loading machine with the films in fire-proof containers. This machine is moved into the booth and into contact with the magazine, and the film, under proper safeguards, is automatically wound into the magazine or removed therefrom, while opportunity is given the operator to examine the film. These operations are never carried on while the audience is present. It will thus be readily understood that our method and means defeat the only serious remaining fire hazard in connection with motion picture operation—the handling and manipulation of the film outside of the projector.

An object of our invention is to provide an automatic projecting machine capable of handling an unprecedented bulk of film at one loading. Another object is to provide complete fire protection for motion picture operation including safeguards for the handling of the film outside of the projector as well as within the projector. Another object is to provide a completely automatic rewinding projector with automatic control applied to every manipulative process. A further object is to add various improved features to the several co-pending applications to which reference is made in the following portion of this specification.

Previous to this invention, so far as we are aware, the speed of the rewinding operation has not been controlled in relation to the building up of the mass of film upon the hub. The conventional practice in machines making use of the stripping devices, to which reference is often made herein, is to apply power to the rewinding reel after the film has been stripped, and to let that reel continue to revolve at whatever speed it will, irrespective of the fact that the lineal speed of the film at the conclusion of the rewinding operation may be twenty-five times or more as great as it was at the beginning of the operation with a terrific momentum and consequent strain upon the film. According to our practice, we carry out the rewinding at a constantly changing speed in terms of R. P. M. so calculated that the lineal speed of the film is constant. As a result strain and momentum at the conclusion of the operation are completely avoided.

Another object is to render the damping means associated with the sound head ineffective during the rewinding operation and during the threading operation and automatically effective during projection. A related object is the interconnection of the control of the damping means with that for the exciter lamp, photoelectric cell, sound gate, and the other operable elements of the apparatus.

According to conventional practice, reels with hubs which are of small size in relation to the size of the reel on a whole have been used. As a consequence, the difference in lineal speed following a constant number of R. P. M. and the difference in R. P. M. as the lineal speed is changed by the building up of the mass have been very great. We have found that at an inconsequential sacrifice of carrying capacity, we may enlarge the hub and avoid these difficulties. An object therefore of our invention is to provide a reel with a relatively large hub for use in an automatic machine.

At the present time a skillful operator may "change over" from one machine to another so that the uncritical members of the audience do not know of the change that is being made. The audience is not equally fortunate when the operator is unskilled and indeed there may be actual breaks between reels, particularly in connection with the sound. An object of our invention is to give better presentations by making the entire program, or a large part of it, literally continuous without any "change over" whatever. A related object is greatly to reduce the skill of operation which is required as well as the amount of labor.

As will be apparent from this entire specification, a very important object of the invention is to safeguard the public by having all the exposure and manipulation of the film carried out outside of the booth or, if within the booth, at a time when the audience is not present. A related object is to provide certain safeguards which are effective within the machine during the actual projection and rewinding of the film.

An object of the invention is to provide improved and automatic control means for film handling apparatus. The following specification presents many illustrations of such improvements, including, for example, the provision of a double clutch mechanism for the take up reel which permits the loading operation to be carried on at a high continuous speed and improved interconnection between the various clutches which makes the machine proof against the consequences of careless operation.

An object of the invention is to provide continuous movement of the film at a constant rate, excepting of course the small section which starts and stops at the picture aperture, to control the mechanism automatically and in an effective manner, and to surround the mechanism with safeguards for preventing damage to the film. A related object is to provide an entirely mechanical drive which maintains both carriers in the desired synchronism with each other and the toothed film feeding elements and alternatively to provide a drive for such purposes under the control of the film itself.

An object of the invention is to provide detachable delivery and take up carriers, with the control means therefor and for the permanently located sound and picture heads definitely and properly interconnected. A related object is the provision of improved methods of loading film into the projecting apparatus and removing it therefrom.

A related object is the provision of loading machines by the use of which the film can be placed into and taken out of the apparatus in an improved manner, with or without automatic control means.

An object of the invention is to provide improved mechanism to time the alternations between the projecting and rewinding cycles, with or without operative interconnection with the other control mechanism of the apparatus.

Other objects, advantages and characteristics of our invention are apparent in the following description, the attached drawings and the subjoined claims. Although we are showing merely preferred embodiments of each of the several phases of our invention for purposes of illustration only, it will be readily understood that we are not limited to these particular methods and constructions as changes can readily be made without departing from the spirit of the invention or the scope of the broader claims.

In the drawings:

Figure 1 is a top plan view largely diagrammatic showing one method in which we load and unload our magazines.

Figure 2 is a side view of a movable loading and unloading machine which we employ in a slightly modified form of our invention.

Figure 3 is a top plan view of the film magazine of the loading machines shown in Figures 1 and 2.

Figure 4 is an enlarged section of a take up magazine showing the mounting of the inner reel supporting structure within the outer casing and a method of attaching the film to the core.

Figure 5 is a side view of the projecting and sound heads and lamp house with the magazines applied thereto.

Figure 6 is an end view corresponding to Figure 5.

Figure 7 is a view largely diagrammatic of the film handling members disposed between the magazines and the control mechanism therefor, the members being in projecting position, certain parts being omitted for clarity.

Figure 8 is a view of the sound head showing the members thereof in film threading or film rewinding position with the damping means having been automatically rendered inoperative.

Figure 9 is a view largely diagrammatic showing one method of automatically controlling the reversal of the apparatus.

Figure 10 is a view of a portion of one form of a control mechanism.

Figure 11 is a view taken on the lines 11—11 of Figure 10.

Figure 12 (Sheet 4) is a detail view taken on the line 12—12 of Figure 11 showing the detail of the control mechanism.

Figure 13 is an enlarged view of a portion of the control mechanism shown in Figure 10.

Figure 14 is a section taken on the lines 14—14 of Figure 13.

Figure 15 is an end view corresponding to Figure 6 showing an alternative method of applying our invention in which the film itself controls the speed of operation of the delivery or take-up carrier or both.

Figure 16 is a side view of the magazine showing the carrier controlling means constructed according to this exemplification of our invention.

Figure 17 is a top plan view of the subject matter of Figure 16, including an enlarged portion of the electrical control means.

Figure 18 is a side view of another and alternative method of applying our invention in which the speed of the delivery carrier or the take-up carrier or both of the same is controlled through rheostats for the driving motor or motors, these rheostats being mechanically controlled.

Figures 19 and 20 are enlarged views of the cams which control the speed of operation of the delivery carrier and the take up carrier.

Figure 21 is a side view of a damping device alternative to that shown in Figures 7 and 8.

Figure 22 is a partial end view of the same. For the control of this damping device see Figure 31 upon Sheet 3.

Figures 23 and 24 are side and top plan views respectively of another preferred form of timing device in which the control cams perform the double function of determining the speed of the two carriers and also actuating the means which time the projecting and rewinding cycles. Figure 25 is a circuit diagram of the preferred form of our invention shown in Figures 23 and 24.

Figure 26 is an enlarged detailed view of another preferred form of control mechanism embodying also two safety devices, one, a supported loop to compensate for minor irregularities in feed, and, two, a device for turning off the light and the motor circuits if the tension upon the film becomes too great or too little.

Figure 27 shows the two said safety devices, but independent of the control mechanism.

Figure 28 is a detailed top plan view of a portion of the control mechanism of the preferred form of our apparatus which is shown in Figures 15, 16 and 17, with particular reference to the control of the control motor. Figure 29 is a side view partially in section corresponding to Figure 28. Figure 30 is an end view partly in diagram corresponding to Figure 29.

Figure 31 (sheet 3) shows the control of the damping device of Figures 21 and 22.

Figure 32 is a wiring and operating diagram of a motor reversing switch.

In carrying out our invention we may employ a delivery magazine 11 from which film supported thereby is supplied to projection and sound heads shown generally at 12 (Figures 5, 6, 15 and 2), and to a take-up magazine 13. A lamp house 14 of conventional type supplies light to the projecting head. As a main frame for the apparatus we may employ an irregularly shaped casting 15 extending upwardly from a base 16 and including latches 17 for the take-up magazine 13. These latches may include pins 18 mounted upon lugs 19 which extend to the left as viewed in Figure 6 from the casting 15. Springs 20 for the latch members 17 hold them in engagement within the take-up carrier 13. Similar attaching means including the latches 21, pins 22, lugs 23, and springs 24 may be provided for the delivery carrier. A bracket 26 is shown as supporting the heads generally shown as 12 and the lamp house 14.

The take-up magazine 13 is shown in Figures 1, 5 and 6 as supported upon the truck 29 which is mounted upon the wheels 30 for which a track 35 is provided. A portion of this track 35 is mounted upon a second truck 33 for movement therewith. By means of wheels 34 this second truck is movable upon a second track 32 which extends a short distance at right angles to the optical axis of the apparatus. When the operator wishes to load or unload the take-up magazine 13, he unlatches it from the supporting casting 15 and upon its truck 29 moves it bodily with the truck 33 to the point at which the small section of track 35 mounted upon the truck 33 is in line with the track 35 extending to the loading table 522. In Figure 1 the take up magazine of the projector A of a battery of three projectors, indicated generally as A, B and C, is shown as having been moved out from its projector and in line with the section of track 35 leading directly to the loading table. The take up magazine 13 from the projector B or C is shown as in position to be loaded or unloaded at the table 522 (Figure 1). Thus it will be seen that when the operator wishes initially to insert a film into the take up carrier or to remove a film therefrom, he unlatches its magazine from the supporting frame, moves it upon the two trucks at right angles to the optical axis of the apparatus until it is free therefrom and then moves the primary carriage along its track to the loading table. Here in a way later described he loads or unloads the magazine and thereafter pushes the magazine along its tracks back to appropriate engagement with the projector. Alternatively, as is later described, the take up magazine may be loaded by having a loading machine brought to it, as shown in Figure 2. In either case, however, the film, except for a very small section, is never exposed within the booth, and the film making up each program is handled only twice during its life in each particular theatre.

According to a preferred embodiment of our invention, the delivery magazine is not ordinarily removed from contact with the apparatus, but, as for certain emergency purposes, later described, such removal may be desirable. The weight of the delivery magazine 11 is carried by a bracket 40 extending from the frame 15 to the left as viewed in Figure 6. In order to effectuate this removal, the latches 21 are opened, and by means of ropes or cables 41, 42 and 43 operating through pulleys 44, 45 and 46 the magazine is bodily raised and suspended from the member 47 which operates upon wheels 48, running on a track 49. Through appropriate mechanism, not shown, the delivery carrier 11 may be moved as desired.

In automatic apparatus such as that herein shown and described, film breakage is reduced to a minimum. In view of the excellence of construction of modern projectors the major fraction of film breakage is due directly and indirectly to the mishandling of the film outside of the projector, generally in rewinding. According to our means and method, rewinding is automatically accomplished at a uniform speed within the projector and as a consequence breakage and the film impairment which later results in breakage is avoided or greatly decreased. If there is film breakage, however, or if an accident should happen to any part of the projector, by means of the track and other mechanism just previously described, the magazine containing the unused portion of the entertainment may be quickly moved into another or emergency projector and that projector at once put into service. Although one machine is sufficient for one theatre and can give a continuous show of over three hours, if a spare machine is provided, as is always recommended particularly for the so-called "grind" houses, in which showing is continuous, it can readily be placed into service.

As previously stated, according to our invention, the film is delivered from the delivery carrier and taken up upon the take-up carrier at a uniform lineal speed and it is similarly rewound although at a much higher speed. Both carriers are driven during each cycle. Intermediate the two carriers, the film passes through a picture and sound head, which is shown diagrammatically in Figure 7. Before describing the several means any one of which may be employed to drive the delivery and take-up carriers, we shall now describe the film feeding apparatus which may be common to all types of carriers.

Figure 7 shows this apparatus, largely diagrammatically.

From the delivery carrier 11 we feed the film (f) downwardly to a continuously operating sprocket 51 against which the film may be pressed by a pressure member 52 mounted upon a control plate 53. For removing the film from the teeth of the sprocket 51 and shielding it therefrom as during a threading or rewinding operation, we provide a shielding or stripper member 54 which may be constructed in the manner described and claimed in Patent No. 1,736,750 to Barton Allen Proctor dated November 19, 1929, or in any other desired form. Formed integrally with the shielding member 54 or attached thereto may be two gears 55 and 56 respectively, gear 55 engaging teeth 57 cut upon the control plate 53 and gear 56 engaging teeth cut upon a vertical control member 58, this construction being such as that which is described and claimed in some of its aspects in the copending application of Warren Dunham Foster, Serial No. 347,959, filed March 18, 1929.

As the film passes downwardly from the above described continuous delivery sprocket assembly, it may extend through an openable gate which includes a relatively fixed member 59 and a relatively movable member 60 and thereafter into contact with an intermittent sprocket 62 with which there is associated a pressure member 63 mounted upon a control plate 64 and a shielding member 65 including gears 66 and 67 which mesh respectively with teeth cut in the horizontal control plate 64 and the vertical control member 58— all as previously described for the continuous delivery sprocket. For operating the movable gate section 60, a member 69 is attached to or formed integrally with the control plate 64 for the pressure member 63 and thereby moves the gate section 60 upon the movement of the control plate 64. A light source 70 is controlled by a switch 71 which is operated by an arm 72 operated by a pin in the control member 64. Thus it will be seen that as the gate is opened and closed the light source is rendered operative and inoperative. For purposes of illustration an incandescent light source is shown, but it will be readily understood that a carbon arc may be employed if desired.

The construction and operation of the parts associated with the continuous taking up sprocket 75 are similar to those described above. A pressure member 76 is mounted upon the control plate 77 and a shielding member 78 is associated with this sprocket. Movable with this shielding member also are teeth 79 and 80 which co-act with appropriate teeth cut in the plate 77 and the control member 58 respectively so that these parts are operated in timed relation to each other and to the operation of the previously described parts.

The drive for the continuous sprockets and the intermittent sprocket is not shown, since it may be of any desired or conventional type. We prefer to render this drive inoperative during threading or rewinding by automatic mechanism, operatively intermounted with the control member 58, as for example is shown in applicants' co-pending application Serial Number 653,140, filed January 23, 1933, and allowed November 22, 1935. It will also be noted that the construction shown in Figure 9 is adapted to accomplish this result by the means illustrated and claimed in Patent Number 1,943,303, dated January 16, 1934, and co-pending herewith, to which more specific reference is later made herein.

From the continuous take-up sprocket 75 the film passes downwardly, as viewed in Figure 7, through the sound head. This sound head is show as provided with a fixed gate section 82 and a movable gate section 83 with which is associated an optical element 84 which focuses the light from an exciter lamp 85 upon a photo-electric cell 86. The optical element is preferably movable with the gate. A continuous sound sprocket 87, driven in any conventional manner and controlled as are the other sprockets, may be provided together with a pressure member 88 mounted as before upon a control plate 89. A shielding member 90 associated with the sprocket 87 may have teeth 91 and 92 movable therewith to cooperate, as previously described, with appropriate teeth cut in the control plate 89 and control member 58 respectively. To operate the movable section 83 of the sound gate a member 94 is attached to or formed integrally with the control plate 89. To control the exciter lamp 85 a switch 96 is operated by an arm 97 which through an appropriate pin and slot connection is operated by the movement of the control plate 89. Similar mechanism is provided for the photo-electric cell 86, this mechanism including a switch 98 operated by an arm 99 which is moved through an appropriate pin and slot connection by the control plate 89.

Between the sound head and the take-up carrier, we supply appropriate damping means which we render operative and inoperative in accordance with the direction of movement of the film. That is to say, while the film is moving in a projecting direction and pictures are being shown therefrom and sound reproduced, we render the damping means effective, but while the film is being rewound clear of the teeth of the sprockets and at a higher rate of speed we render the damping means ineffective in order to save wear and tear upon the fragile film. Also, we move the damping means to inoperative position and hence out of the way prior to the threading operation. The damping means which we employ may be of any desired type. Two are shown for purposes of illustration, one in Figures 7 and 8 and the other in Figures 21, 22 and 31.

The damping means shown in Figure 7 includes two smooth rollers 101 and 102 mounted for free rotation upon an arm 103 which is pivoted upon a stud 104. Attached to this stud to the rear of the arm 103, as shown in Figure 7, is a small gear 105 which meshes with teeth 106 cut in a control member 107 which is attached to or formed integrally with the control member 89. Thus it will be understood that the transverse movement of the control member 89 and the lower portion of the member 107 attached thereto and movable therewith will be effective for rocking the arm 103 and moving the rollers 101 and 102 from the position shown in Figure 7 to that shown in Figure 8.

The film f extends from the above described damping mechanism to a throat 109 leading to the take-up magazine 13. Suitable fire preventing means are of course applied to this throat.

Any preferred means may be employed to create the necessary unsupported loops of slack film between the continuous delivery sprocket 51 and the intermittent sprocket 62, and between the intermittent sprocket 62 and the continuous take-up sprocket 75. We may prefer to use that described and claimed in the last above mentioned application of the said Foster or in his application Serial No. 356,564 filed April 19, 1929, which matured as Patent Number 1,943,305, or in our applications Serial No. 352,525 or 653,140 filed April 4, 1929, which matured as Patent Number 1,993,735, and January 23, 1933, respectively, but are not limited to any particular type of automatic loop forming. In any event, however, we much prefer that the loop forming device which is used be definitely correlated to the control mechcanism herein described, preferably in accordance with the teaching of the above mentioned applications.

A control mechanism for the above described sound and picture heads will now be described.

An operating arm 111 may be pivoted upon a control shaft 112. From the right hand portion of this arm as viewed in Figure 7, a connection 113 extends to the vertical control member 58. To rock this arm and hence operate this control member 58 and with it all of the operable parts of this portion of the apparatus, two oppositely acting solenoids 115 and 116 may be attached in any appropriate manner to the left hand end of the arm 111 as shown in the drawings. It will be readily understood that when the solenoids are in the position shown in Figures 7 and 9, for example, the apparatus will be effective for projecting pictures and reproducing sound. When, however, the solenoids are moved from the position shown in Figure 7, the arm 58 will be moved downwardly. This movement will be effective to move the pressure members 52, 63, 76 and 88 away from their appropriate sprockets, to rotate the shielding members 54, 65, 78 and 90 respectively to shielding position whereby the film is stripped from the teeth of the sprockets 51, 62, 75 and 87 respectively and to open the picture gate and sound gate by moving the sections 60 and 83 away from the fixed sections 59 and 82. Such movement will also break the circuits to the projection light 70 and exciter lamp 85 and to the photo-electric cell 86. Such movement also will render the damping means ineffective. With the parts in such position, an initial threading or a rewinding operation may be carried out. Figure 8 shows the sound head in such position.

Under some circumstances, it is desirable to introduce sequential movement of the gate members, presser members, and film removing and protecting members. In such cases, the mechanism described and claimed in our co-pending application Serial No. 345,716 filed March 9, 1929, which matured as Patent Number 1,996,759, or in cases which are continuations in part thereof or divisional thereto may be used, namely applicants' Serial Number 458,536, filed May 31, 1930, and upon September 17, 1934, matured as Patent Number 1,954,808, and Serial Number 627,788, filed August 6, 1932, as a continuation of Serial Number 458,537, filed May 31, 1930.

From the previous portion of this specification it will be obvious that the change from the projecting position to the rewinding position should come when the film is largely removed from the delivery carrier and largely coiled upon the take-up carrier. Similarly, after the film has been largely rewound upon the delivery carrier the parts should then be moved back to the projecting position.

To accomplish these changes the solenoids 115 and 116 are alternatively energized. Where desired, other means may be employed to accomplish this end but we may prefer to make use of those described and claimed in the co-pending application of Warren Dunham Foster, Serial No. 57,392 filed September 19, 1925, which upon January 16, 1934, matured as Patent No. 1,943,303.

For purposes of illustration we are showing a specific improvement over the control means employed in said co-pending application.

As clearly shown in Figure 9, one lead of the circuit 117 is electrically connected to a pivot 118 upon which an arm 119 is mounted which in turn supports a roller 120 which is adapted to contact with an edge of the film and rides thereupon. It may be held in contact with the film either by its own weight or by a suitable spring not shown. The other lead of the circuit 117 is shown as attached to a roller 121 formed of conducting material and mounted upon a shaft 122 upon the side of the film opposite that upon which the roller 120 rides. A cut out portion 123 of the edge of the film obviously will cause the roller 120 to make contact with the roller 121 thus closing the circuit 117 and energizing the solenoid 115 which thereupon draws downwardly the link 113 and the control member 98 thereby operating the operable film engaging elements and switches associated with projecting and sound heads as previously described. It will of course be understood that the cut out portion 123 is placed adjacent the trailing end of the film so that the reversal will be timed after the film has been entirely projected, save for the "trailer."

A switch 124, either manually or automatically operable, is introduced into the circuit 117 so that this circuit may be opened or closed independently of the film, so that the operator may initially rewind the film from the take-up carrier back to the delivery carrier, after the take-up carrier has been first loaded, and otherwise manipulate the apparatus independently of the automatic control.

The solenoid 116 may be controlled similarly to the solenoid 115. A circuit 127 may have one lead connected to a shaft 128 upon which is mounted an arm 129 which supports a roller 130 which travels upon an edge of the film. The other lead of the circuit 127 may be attached to a conductive roller 131 mounted upon a shaft 132 and placed upon the opposite side of the film and in substantial alignment with the roller 130 so that when a cut out edged portion of the film is brought between the rollers the circuit 127 will be closed. A switch element 134 is also introduced into the circuit 127.

In the interests of simplicity, circuits 117 and 127 respectively have been shown as directly controlling the solenoids 115 and 116. As a matter of fact, however, we prefer to control these solenoids through any desired or conventional relay devices so that a current of extremely low voltage and amperage may be employed. It will be of course readily understood that we are not limiting ourselves to the control devices which are shown in the said co-pending application Serial No. 57,392, which matured as Patent Number 1,943,303. Any other preferred device may be used such as for example, those shown in a co-pending application of Barton Allen Proctor, Serial No. 641,812, filed November 8, 1932, which matured as Patent Number 2,007,214.

If desired, mechanical timing devices for effecting the alternations of directional movement may be employed, preferably such as those described and claimed in Patent No. 1,695,857, dated December 18, 1928, to the said Proctor or in his co-pending application, Serial No. 227,383, filed October 19, 1927, which upon January 16, 1934, matured as Patent Number 1,944,034.

Braking means for either or both carriers, operatively interconnected with the control mechanism in the manner taught by the co-pending application of Barton Allen Proctor Serial Number 332,296 filed January 14, 1929, which matured as Patent Number 1,944,035, or of Warren Dunham Foster Serial Number 335,832, filed January 29, 1929, which matured as Patent Number 1,943,304, may be employed.

In the succeeding portion of this specification alternative means are described for accomplishing these alternations in movement, such means being associated with the delivery carrier and the take-up carrier and/or the means for controlling the speed of operation of the said carriers. If desired, however, photo-electrical means such as those described and claimed in the co-pending application of Warren Dunham Foster and Earle Parmelee, Serial Number 105,159, filed April 28, 1926, which matured as Patent Number 1,944,024, may be employed.

As previously stated, a very important part of the present invention is the continuous driving of both the delivery and the take-up carriers at a constant speed during the entire feeding and rewinding operations irrespective of the diameter of the mass of film upon the carrier. According to conventional practice, the delivery carrier is revolved by the traction of the film as it is fed therefrom by the continuously driven delivery sprocket. Consequently, its speed in terms of revolutions per minute is very low when the carrier is full and very high when the carrier is almost empty. Throughout these changes of speed of the carriers the lineal speed of the film remains constant, generally at 90 feet per minute if sound is being reproduced therefrom. In the conventional reel the differences in rate of rotation of the reel at the beginning and at the end of the feeding operation are very great. In the ordinary ten inch reel, for example, the hub is ordinarily two inches in diameter with a circumference of approximately six inches and the diameter ten inches with a circumference of approximately thirty-one and one-half inches, the difference in speed therefore being approximately five to one. If such a reel were enlarged to the size necessary to accommodate twenty thousand feet, its outside circumference would be so great that the difference of speed between the beginning and end of the feeding or rewinding operation would be approximately as 1 is to 23. The speed in terms of revolutions per minute at the start of operation would be about 8 and at the conclusion 180. It will be readily understood that with any such difference of speed and with the very great speed and momentum of so heavy a reel at the conclusion of a feeding operation, great and apparently insoluble practical problems would result.

To avoid these difficulties, we use a carrier with a relatively large hub. As a result, we can build a carrier which although it accommodates 20,000 feet of film, has a difference in speed ratio at the beginning and end of each operation merely as one to three. We start at about seven revolutions per minute and conclude at twenty-one. The extra space required in a reel of such construction is very small indeed, since the rapid increase in capacity with the use of the larger hub is much greater than the small additional diameter would seem to indicate. The sixteen inch hub, which we may prefer to employ, causes us to sacrifice approximately 2,000 feet of capacity over a hub of the conventional diameter. A reel of forty-eight inches in diameter with a sixteen inch hub will accommodate the twenty thousand feet. A reel of about forty-five inches in diameter with a two inch hub is required for 20,000 feet—a saving of about three inches. Thus by a sacrifice of less than 7% in size we gain the greater ease of operation which comes from the much decreased speed of revolution of the reel. As a matter of fact this sacrifice is apparent rather than real, for an increase of slightly over one inch in the diameter of our four foot reel would enable us to carry the extra 2,000 feet. As a result of our relatively large hub we are able to maintain the maximum reel speed in the feeding operation at twenty-one revolutions per minute as against approximately one hundred and eighty revolutions per minute if we followed the conventional practice. The difference in this lowered speed is obviously important as it much reduces the momentum and fly wheel effect of the carrier operation. In rewinding, the difference is even more startling. If we rewind at thirty times the projecting speed, we have a maximum speed with one reel of six hundred and thirty revolutions per minute but with a reel of this capacity built according to present practice the maximum speed would be 4800—manifestly impossible in a film handling apparatus of any type, and particularly so in one which employs a carrier which supports over one hundred pounds of film.

The figures in the above discussion are to be taken as approximate, since the thickness of films and the tightness of winding vary.

In our co-pending application Serial Number 352,525, filed April 4, 1929, which matured as Patent Number 1,993,735, we show means for continuously driving the delivery carrier, primarily during the first portion of the feeding operation, to supply film to the continuous delivery sprocket and the remainder of the mechanism. This application, so far as we are aware, is the first example in the art of the continuous drive of a delivery carrier. In the present invention we go a step further and continuously drive the delivery carrier throughout the entire feeding operation. Obviously if we follow the conventional practice of revolving the delivery carrier by the traction of the film as it is moved by the continuous delivery sprocket we would put a considerable strain upon the film. Such strain is particularly serious only at the beginning of the operation. It is obvious, therefore, that in case it is not desired to drive the delivery carrier throughout the entire feeding operation, our last above mentioned invention may be employed and the delivery carrier driven merely until its inertia is overcome and its momentum established, after which time it is practical to continue the revolution of the delivery carrier by the traction of the film.

From time to time, generally early in the art, various devices have been proposed for applying power to the delivery carrier in step with the film moving operation of the intermittent feeding means. These devices have been proposed as substitutes for the continuous delivery sprocket with its associated loop of slack film. As a result the delivery reel has started and stopped theoretically in time with the starting and stopping of the intermittent. Such operation is entirely different from and indeed directly contrary to our practice herein, and any such operation would render impossible the results which we obtain.

As those skilled in the art are aware, according to the conventional practice, the take-up carrier is driven continuously at a rate of speed higher than the maximum rate of progression of the film through the apparatus and, as a result of the operation of a slip clutch of some sort between the take-up carrier and the drive therefor, there is enough slippage so that the take-up carrier does not run ahead of the delivery of film thereto by the continuous take-up sprocket and the film is not broken. In view of the relatively large weight of the mass of film which we employ, we prefer not to subject the film to the relatively great strain of this type of take-up. As a consequence we drive the take-up as well as the delivery carrier at a rate of speed in terms of revolutions per minute which constantly varies as the mass changes so that the winding up operation is carried out at a constant lineal speed. According to our invention, therefore, by mechanical means the entire mass of the film, always excepting the small section associated directly with the intermittent movement, moves through the apparatus at a continuous speed, this result being accomplished without subjecting the film to any strain. As is later pointed out in detail, we may operate these mechanical driving means under the control of the film itself, but we may prefer to operate this mechanism by purely mechanical means.

In order to drive a shaft 135 of the delivery carrier at continuously varying rates of speed, we may employ any desired mechanical or electrical means. For purposes of illustration we show in Figures 6, 10 and 15, various modifications of the so-called Reeves drive. A belt 136, comprised of wedge shaped portions, passes between laterally movable cones 137 and 138, which together form the pulley for the delivery shaft 135, and two similar cones 139 and 140, likewise laterally movable upon and driven by a shaft 141. Through miter gears 142 and 143 shaft 141 may be driven by an operating shaft 144, which may be driven by a main motor M of the apparatus, as later described. It will be readily understood by those skilled in the art of mechanics that as the cones 137 and 138 are moved as by being brought closer together, for example, and the cones 139 and 140 are moved as by being further separated, the speed of the shaft 135 will be quickly increased. Such movement in either direction is readily obtained by connecting the hubs of pulleys 138 and 139 and 137 and 140 by control levers 145 and 146 pivoted upon a transverse bar 147. Movement may be communicated to the control members 145 and 146 by right and left hand screws cut in a shaft 149 and cooperating with suitable threaded members in the ends of control levers 145 and 146. It will be understood, therefore, that the rotation of the shaft 149 in one direction will gradually increase the speed at which the shaft 141 drives the shaft 135 and hence the delivery carrier and that rotation of the shaft 149 in the other direction will rapidly and very accurately decrease such movement, as for the later rewinding operation during which the delivery carrier acts as a take-up carrier. For revolving the shaft 149 a pulley 151 may be attached thereto and operated as by a chain 152.

Movement may be communicated to this chain 152 in direct relation to the building up or the reducing of the mass of film upon the carrier in the following preferred manner: Upon a shaft 153, a sprocket wheel 154 may be applied, as is also a pinion 155 which in turn is operated by a segmental rack 156, which is supported upon and formed integrally with an arm 157 journalled upon a stub shaft 158, which is mounted upon a long irregularly shaped bracket 159. Formed integrally with the arm 157 or attached thereto is a short operating lever 160 to the extremity of which is journalled a cam follower or control roller 161. This control roller 161 engages with the surface of an adjustable cam 162 which in a manner later described in detail is adjustably connected with a shaft 163. This cam is plotted in accordance with the differing diameter of the mass of film upon the delivery carrier. Therefore the revolution of this cam in accordance with the feeding of film through the apparatus will vary the speed of revolution of the delivery shaft 135 exactly as the mass of film thereupon decreases or builds up. With the parts as in the position shown in Figure 10 the projecting operation is about to be concluded and the rewinding operation is about to begin.

For driving the take-up carrier in the same direction as that in which the delivery carrier is driven and at an always corresponding speed, similar mechanism may be employed. A sprocket chain 166 corresponds to the sprocket chain 152 and drives the speed controlling device of the delivery carrier in exactly the same manner as that in which the speed controlling device of the delivery carrier is driven. A chain 166 is driven by a sprocket wheel 167 attached to a stub shaft 168 with which moves a pinion 169 which drives a segmental rack 170 mounted upon or formed integrally with a lever arm 171 which is pivoted upon a stub shaft 172 supported by the bracket 159. Extending from the arm 171 or formed integrally therewith is a short lever 173 upon the extremity of which is journalled a cam follower or control roller 174 which engages with a take up control cam 175 which is adjustably mounted in a manner later described in detail upon the shaft 163. The shaft 163 is driven by a large gear 178 which in turn is driven by a pinion 179 which revolves with a worm gear 180 which in turn is driven by a worm 181 attached to the main operating shaft 144. It will be readily understood that this reduction is very great. The gearing shown for purposes of illustration reduces the speed of the power shaft 144 two thousand to one. The sprocket chain 166 leads to and controls parts in the control mechanism for the take up carrier which exactly correspond to those in the control mechanism for the delivery mechanism. Consequently they are not described. In the drawings the same reference characters are applied to the elements in this take up mechanism as are applied to the corresponding elements in the delivery mechanism, but with a prime character added.

From the foregoing portion of this description it will be evident that these two carriers must be driven to meet three different sets of conditions. In a preferred form of our invention as previously stated, the take-up carrier alone is first driven in a projecting direction solely for the purpose of loading it with the separate films which are to be joined in order to constitute the program. This loading operation can be carried out at a high speed since the film moves continuously. During the loading operation all of the apparatus, except the take-up carrier, should be inoperable. After the film has been loaded upon the take up carrier, it must be rewound through a cleared channel in the apparatus back to the delivery carrier ready for the first presentation, this rewinding operation likewise being carried out at high speed. Thereafter the film must be regularly projected through the apparatus at a normal projection speed of, say 90 feet per minute. From this point onwardly automatic rewinding at high speed and automatic showing at regular speed will be alternately continued. It is obvious, therefore, that three different drives must be provided together with unitary control means which will absolutely prevent any mechanical conflict of any kind or any ill results if the operator is careless.

Preferred means for accomplishing the above results are shown in Figures 10, 13 and 14. Figure 13 is an enlargement of the lower left hand corner of Figure 10 from which certain reference numerals have been omitted for purposes of clarity.

To revolve the operating shaft 144 in a projecting direction but at high speed, in order initially to load the take-up carrier the following mechanism may be employed:

A double faced miter gear with teeth 185 is provided pinned to the shaft 144. These teeth mesh with those of a miter gear 186 attached to a shaft 187 journalled as in a bracket 188. A clutch member 189 is attached to the opposite end of this shaft. Opposite this clutch member is a cooperating clutch member 190 attached to a shaft 191 journalled as in a bracket 193 and driven by a pinion 194. To move these clutch members 189 and 190 into and out of operative relation one with the other, a depending control plate 196 may be provided. Attached to this plate is a plate 197 so constructed as to extend to the other side of the shaft 191 and so, with plate 196, to complete the clutch operating yoke. Pins 198 and 199 operating in cam slots 201 in the control plates 196 and 197 will move the clutch member 190 to and from operative relation with the member 189 upon the lowering and raising of the plate 196.

In order to carry out the regular projecting operation it is necessary to drive the operating shaft 144 in a projecting direction but at normal projecting speed. This result may be accomplished as follows:

A lower face 202 of the previously described miter gear structure carrying the teeth 185 engages with teeth 203 of a miter gear attached to and revoluble with a shaft 204, likewise journalled in the bracket 188. To the left hand portion of this shaft, as viewed in Figure 13, a clutch element 205 is attached which is shown as in engagement with a clutch element 206 which in turn is splined to a shaft 207, this shaft being revoluble with the worm gear 208. This clutch is rendered operative and inoperative by pins 210 formed in yoke members 211 which are constructed for movement with the control shaft 112 previously described. The rotation of this shaft in a clockwise direction as viewed in Figure 13 will be effective to render the clutch operative and its movement in an anti-clockwise direction will be effective to render the clutch inoperative. The operation of the control shaft 112, which may be accomplished either manually or automatically, is elsewhere described. A bracket 214 may be supplied for supporting the control shaft.

In order to drive the operating shaft 144 in a rewinding direction and at high speed the following mechanism may be employed:

A miter gear 217 fixed to the operating shaft 144 engages with and is driven by a miter gear 218 attached to a shaft 219 likewise journalled in the bracket 188. To the other end of this shaft a clutch member 220 may be applied, a similar member 221 being attached to shaft 222, in line with shaft 219, which is driven by a pinion 223. To operate this rewinding clutch, yoke arms 225 may depend from the control device previously described for the regular projection clutch, pins 226 operating in appropriate grooves 227 in the clutch member 221. The rotation of the control member 213 in an anti-clockwise direction will be effective to render the rewinding clutch operative by engagement between the members 220 and 221 and movement thereof in a contrary direction will be effective to render the clutch inoperative. It will be readily understood that the regular projection and the rewind clutches must never be in engagement at the same time and the above described mechanism very clearly accomplishes this result.

It will likewise be understood that at no time must the regular projection clutch and the high speed projection clutch be in simultaneous operation, no matter what mistake the operator may make. Neither should the high speed projection or the rewinding clutch be simultaneously in operative position. Positive protection upon these points is very simply provided. The depending control plate 196 is extended sufficiently far downwardly as viewed in the drawings to form contact at its lower enlarged extremity 229 with rollers 230 and 231 mounted in lateral extensions 232 extending from or formed integrally with the yoke members 211 and 225. By reason of the above construction it will be evident that when the control shaft 112 is rotated in clockwise direction to open the high speed rewinding clutch that act will cause contact between the roller 230 and the depending portion 229 of the control plate 196 and raise both of the same thereby declutching the high speed projection clutch so that only the regular projection clutch will be operative or operable. Similarly a counter-clockwise movement of the control shaft 112, as for the purpose of opening the regular projection clutch and closing the rewinding clutch, through the contact of the roller 231 with the depending portion 229 will likewise make certain that the high speed projection clutch is inoperative and inoperable. No conflict between the regular projection and rewinding clutches is possible since both are alternatively operated by the same structure, which in turn is controlled, as above described, in interlocked relation to the high speed projection clutch.

In order to drive the high speed projection and high speed rewinding driving shafts in appropriate and opposite directions, a gear 234 is provided attached to the worm wheel 208 and in engagement with the pinions 194 and 223 respectively. This worm wheel 208 in turn is driven by a worm 235 attached to the motor shaft 236.

It will be understood from the preceding portion of this specification that the operating shaft 144 drives merely the delivery and take up carriers and the control mechanism therefor and does not drive the head. For driving the head an independent mechanism is provided but one which is controlled in complete harmony with the previously described mechanism.

To drive the head a shaft 240 is provided supported as in the bearing 241 (Figure 11). It will be readily understood that this shaft for driving the head must be declutched both when the film is being initially loaded into the take up carrier and also while the film is being rewound. To accomplish this result, a double clutch control member having engaging faces 242 and 243, is feathered or splined to the shaft 240. Formed on the lower end of this double clutch member is a clutch face 245. It will be understood that the raising of this mechanism as viewed in Figure 11 will bring the driven clutch face 245 out of contact with the driving clutch face 246 which is attached to the driving shaft 247 journalled as in the bearing bracket 248. Means for raising this duplicate clutch member will later be described. The driving shaft 247 is in turn driven by the miter gears 248 and 249 which are attached to and driven by the previously described motor shaft 236.

In order to disconnect the projection and sound heads during the rewinding operation in order to save wear and tear on the mechanism, a clutch yoke 251 including pins 252 engaging with the clutch control member 243 as clearly shown in Figure 11, is mounted upon a pivoted arm 254, which arm is rocked upon its pivot by a depending control link 255. As is clearly shown in Figure 14, this control rod is attached to the control shaft 112 as by a loose pin fixed upon a collar 256 so that the rotation of the control shaft 112 moves the control link 255 upwardly and downwardly as viewed in the drawings. As elsewhere stated, the control shaft 112 may be operated by hand or automatically.

To declutch the head operating shaft 240 during the preliminary loading of the carrier, another clutch control is provided, likewise as shown in Figure 11. A rocking arm 257 is pivoted upon a pin 258 so that the right hand member thereof, which is formed into a yoke, through pins 259 operates the previously described clutch operating face 242. This clutch face and the clutch face 243 are moved against the power of the respective pins by a spring 260. By an inspection of Figure 11 it will be clearly understood that there is no conflict between these two clutch members since either may operate to move the two faces upwardly without conflict.

The pivoted control arm 257 in its left side, as viewed in the drawings, is loosely pinned to and operated by a control link 263. The lower portion of this control link 263, as will be readily apparent from Figures 13 and 14, is attached to and operates the depending control plate 196, which, as previously described, operates the high speed projection or loading clutch. The other or upward portion of the control link 263 is attached to a hand operated device shown in Figure 11 which the operator uses when he wishes to load the take up carrier.

It will of course be understood that when the take up carrier is initially loaded it is desirable to stop the operation of the delivery carrier, both to save wear and avoid destroying the timing of the carrier driving mechanisms. This result is very simply accomplished by a clutch controlling the upper portion of the operating shaft 144, as shown in Figures 10 and 11. A control handle 264 may be pivoted as upon 265 at the top of the control box, as shown in the drawings. Pins 266 attached to the handle 264 work in a slot 267 of clutch member 268 and move it up and down in accordance with the movement of the handle 264 and therefore into and out of engagement with a clutch member 269 of the upward extension, as viewed in the drawings, of the operating shaft 144, this "extension" being of course a separate aligned shaft.

For reasons, which are discussed elsewhere in this specification, it is obviously necessary to remove the cam 162, which controls the delivery carrier, from operative relation to its driving shaft 163 during the loading of the take up carrier. This result is accomplished as is clearly shown in Figures 11 and 20 of the drawings. A depending portion 271 of the rocking control arm 257 terminates in a yoke in which are mounted control pins 272 working in a slot 273 of a shoulder 274 of a mounting plate 275 to which the control cam 162 is attached, as is best shown in Figure 20. This shoulder, while positioned in the position shown in dot and dash lines in Figure 20, is freely rotatable upon the shaft 163 but when by the mechanism above described the shoulder and the parts attached thereto are moved into the position shown in full line in Figure 20 a feather 277 in the shaft 163 causes the cam to rotate with the shaft. This feather is so constructed, as by the portion upon one side of the shaft being of a size different from that of the portion upon the other side thereof, the cooperating openings in the shoulder being appropriately shaped, that the cam can be positioned upon the shaft only in predetermined relation thereto.

The cam 162 is held between plates 278 and 279 which may be attached to each other by screws which extend through a relatively large opening in the center of the control cam. A tongue, 280, extending from the plate 278 to the right as viewed in Figure 20, may be held as between set screws 281 for purposes of fine adjustment as later described. It will thus be seen that the movement of the clutch arm 271 will move this entire assembly so that the cam surface 162 will be brought into and out of operative relation with the cam follower 161.

It is obviously necessary to adjust each cam in its relation to its follower under certain conditions. Figures 19 and 20 show how such adjustment can be obtained. The following description applies to the cam 175, but it will be understood that the cam 162 is similarly mounted. The cam 175, which has a central opening, is placed between plates 286 and 287. Screws 288 hold the plates 286 and 287 in close relation to each other and press against the cam there-between. This pressure is sufficient to cause the structure to revolve as a unit under normal conditions, but to permit manual rotation of the cam independently of the plates. The two plates 286 and 287 are attached to and revoluble with a hub 289 which is pinned to the shaft 163. It will be understood, of course, that the hub of the delivery cam assembly is not so pinned, in view of the previously described means for moving it along the axis of the shaft. A tongue 290 extends from this hub to the left as viewed in Figure 20. The split collar 291 is so disposed that adjusting screws 292 placed therein bear against the tongue 290. A bolt 293 holds the collar in relation to the shaft. It will be readily understood, therefore, that as the bolt 293 is released the entire assembly can be rotated upon the shaft. With the approximate adjustment which is desired obtained as above, the operator will tighten the bolt 293 and will secure his fine adjustment by appropriate movement of the screws 292, being guided by calibrations suitably placed upon a shoulder 294 of the mounting plate 287.

For operating the entire control mechanism by hand without interfering with automatic operation, the mechanism shown in Figures 11 and 12 may be employed. Fixed to the shaft 112 is a manual control lever 295 having at its upward extremity as viewed in the drawings a pin 296 extending through the lever 295 for engagement with appropriate control stations 297 and 298 formed or placed in the adjacent side of the casing. A convenient manual operating knob 299 is provided upon the upward end of the lever. This detent structure is urged inwardly or toward the casing by a spring, not shown. A pin 300 operating in an appropriate slot serves to guide the knob and pin 296 and also when desired to maintain the pin free from locking relation with the stations 297 and 298. When the knob 299 is drawn away from the casing, it may be rotated slightly as soon as the pin 300 escapes from its slot with the result that the detent will be held out of locked relation with the stations so that the automatic operation of the apparatus may be carried out without interference. This arrangement in its broader aspects is such as that described and claimed in the co-pending application of Warren Dunham Foster Serial Number 57,392, filed September 18, 1925, now Patent Number 1,943,303.

In the above portion of this description and elsewhere we have described the means for controlling the operation of the delivery carrier and the take up carrier as a unit largely within one enclosure and the feed for each carrier being operated through a joint mechanism. It will be readily understood by those skilled in the mechanical arts, however, that it is a very simple matter for us physically to separate the two means except for one sectional shafting extending between the two which times the movement of each so that they operate in unison. A clutch may connect the various parts of this shafting. In order to simplify the presentation of the large amount of substance in our invention, we do not show separate but interlocked mechanical control structures, although such may be provided, but we do show separate electrical and film controlled structures, which serve equally well the purposes of full illustration of the invention.

Under certain conditions, it may be desirable to control the drive of the delivery carrier and the take-up carrier by means responsive to the film itself. Mechanism to accomplish this end is illustrated in Figures 15, 16, 17, 26, 28, 29 and 30 of the drawings. A driving shaft 301 for the delivery carrier 11' may have splined upon it cones 302 which are movable along the axis of the shaft. Upon a driving shaft 304 there may be mounted cone 305 for movement along the axis of the shaft, the movement of the cones in the manner previously described obviously being effective to cause a V shaped belt 306 to operate the shaft 301 at the different speeds. For moving the cones laterally along the axes of the respective shafts, control levers 307 may be centrally pivoted as previously described and attached to the several cones so that movement of those levers upon their pivots will be effective to increase and decrease the effective size of the two pulleys. To move these plates, a screw 309 is driven by an auxiliary motor 310. It will be understood, therefore, that the revolution of this motor in one direction will be effective to increase the speed at which the shaft 301 is driven by the shaft 304, and the revolution of the motor in the opposite direction will have the opposite effect. To drive the shaft 304, a sprocket chain 311 passes between appropriate sprocket wheels 312 and 313. A driving motor 314 through a gear box generally shown as 316 is effective for driving the wheels 312 and 313.

One means for operating the control motor 310 is shown in Figures 16, 17, 28, 29 and 30 of the drawings. A light arm 317 carrying a film contacting roller 318 is pivoted at 319 upon the arm 320 to which an adjustable weight 321 is attached. A short lever 322 projects from the pivotal point and is movable with the arms 317 and 320. To the lower end 324 of this lever is attached a cord 325 which passes over pulleys 326 to operate a long operating lever 327.

The means by which the movement of the cord 325 through this long lever 327 controls the control motor 310 will be understood by reference to Figures 28, 29 and 30 (Sheet 9). The long lever 327 is attached to and movable with a plate 328 which is pivoted at 329. A short lever arm 330 may extend from this plate, or be formed integrally therewith, to the right as viewed in Figures 28 and 29. A link 331 is loosely connected to the end of the pivoted control arm 308 of the drive and is loosely connected at its opposite extremity to a link 332. A pin 333 joins the lever arm 330 to the link 332 while allowing relative motion there-between. By means of a pin 334 in its extremity opposite to that to which is connected the link 331, the link 332 is loosely connected to an arm 335 which is pivoted upon a pin 336. From the opposite extremity of this arm, a depending projection 337 engages in a yoke 338 which operates a rocker arm 339 to control the motor 310. Two carbon piles 341 and 342, operated respectively by plungers 343 and 344, are controlled by the movement of the rocker arm 339, and in turn, through the circuit shown in Figure 30, control the speed and direction of the motor 310. It will be readily understood that the downward movement of the left hand portion of the rocker arm 339, as viewed in Figure 30, will depress the carbon pile 341, and the downward movement of the right hand portion of this arm will compress the carbon pile 342. As a result of this first described movement of the rocker arm 339, a greater quantity of current will flow through the control motor 310. On the contrary, the second described movement of the rocker arm 339, after the rocker arm has passed the central or neutral position, will change the direction of rotation of the motor 310, and further downward movement will increase its speed. Thus it will be understood that as the film contacting roller 318 moves inwardly toward the core of the carrier 11', the arm 327 will be operated to increase the speed of revolution of the shaft 301. If at any time the roller 318, due to abnormal conditions of feeding, should move in the opposite direction, the drive for the carrier 11' will be slackened or reversed until the condition is corrected. Forms of film responsive control other than the one above described may be employed if desired.

The connection between the long lever arm 327 and the pivoted control member 308 is to prevent unnecessary movement of the control motor 310 and so-called "hunting." It will be readily understood that as the lever 327 is moved by the cord 325 it will operate the rocker arm 339 through the above described connections since the power of the cord will be wholly insufficient to move the control member 308 against the motor driven screw. As the motor driven screw, however, moves the control plate 308 to its new position, the linkage between the member 308 and the rocker arm 339 will in turn be effective for moving the rocker arm to neutral position obviously without affecting the long lever 327, neutral position being the one in which the link 332 and the long lever 327 are in line. At this point, the control motor 310 will be inoperative. As a practical matter, under normal conditions of feeding, the movement of the cord 325, and consequently of the entire train of elements controlled thereby, will be relatively slow and continuous and the control motor 310 will operate almost continuously and in one direction. The gear reduction between the control motor and the screw and the pitch of the screw are preferably such that the screw moves very slowly. That is to say, we prefer a slow motor movement and a very fine thread upon the screw.

As is clearly shown in Figure 26, under certain conditions it is desirable to control the drive in a different manner and one which is more immediately responsive to the conditions of film operation. The device shown in Figure 26 also accomplishes two other functions which will later be described. As the film f is advanced between the delivery carrier and the continuous delivery sprocket it may pass over axially fixed rollers 351 and 352. A roller 353 may be mounted upon a lever 354 so that it forms a bight in the film between the rollers 351 and 352. This arm may be pivoted at 355 and a long control lever 357 extend therefrom and have attached thereto a cord 325', which is the exact equivalent in its operation of the previously described cord 325. That is to say, the movement of the cord 325' in one direction, influenced by the above described lever system under control of the film, will be effective to change the speed of the control motor 310 and hence of the carrier, and the movement of the cord in the opposite direction through the lever system under the influence of the film will be effective to stop or reverse the movement of the control motor and hence maintain the speed at which the delivery carrier is driven at this point or slacken it if necessary.

Figures 26 and 27 likewise show means which we may employ to accomplish two additional results. The control mechanism previously described herein has been found extremely sensitive and accurate, but obviously if a machine has become worn or it is not properly operated, there may be slight inequalities in the movement of the control mechanism and hence of the film. For that reason it is desirable to add to the control device an element of safety so that if the drive is not immediately responsive the film will not be broken. This result is very simply obtained by the mechanism shown in Figures 26 and 27. The bight of the film between the rollers 351 and 352 is sufficient to allow for a considerable variation in the speed of the drive so that a dangerous stress in the film will not occur instantly. Even though we do not make use of such a supported bight for control purposes we prefer to introduce it as a measure of safety. If desired the bight may be formed as is described and claimed in the co-pending application of Warren Dunham Foster, Serial Number 567,109 filed October 5, 1931, now Patent No. 2,005,738.

As is likewise shown in Figure 27, we prefer to go a step further, although the safety device may be used as it has been previously described. In circuit with the main operating motor M and the light source 114 we may place a snap switch 361 which includes an actuating member 362 so extending as to be in line with adjustable pins 363 mounted in arms 364 and 365 respectively which extend from the lever 354' which is pivoted as upon a point 355'. This lever and its associated parts may be constructed as previously described in connection with the structure shown in Figure 26, and in the drawings corresponding reference numerals with a prime character have been used in the interests of simplicity. It will be readily understood from the drawings that movement of the roller 353' to the positions 367 or 368 shown in dot and dash line in Figure 27 will be effective for operating the switch 361 to circuit breaking position and hence stopping the operation of the entire apparatus. This mechanism is preferably so adjusted that the movement of the arm to the positions shown as 368 will be effective for stopping operation of the machine before the film is broken. If, however, the film should break, or if the regular operation of the toothed feeding members should be interrupted, the spring 358' will be effective quickly to move the roller 353' to the position shown as 367 thus stopping all operations before harm could result.

The operation of the take-up mechanism may be exactly the same as the operation of the delivery mechanism previously described and similar reference characters to those applied to the delivery carrier with a prime character added are applied to the take up mechanism.

As is readily apparent in Figure 15 of the drawings, the driving motors 314 and 314' for the delivery carrier and take up carrier respectively may be operated by cables which may be attached to or detached from the source of supply either in the operating gear box 371 for the main drive of the apparatus or may be appropriately attached as later described to the loading table 522. The main driving motor M as shown drives a projecting and sound head generally indicated as 12' through connective mechanism generally indicated as 373 in Figure 15. When the take up carrier 13', with the control mechanism therefor, is to be taken to the loading table for loading or unloading purposes, all that is necessary is to disconnect the lead of the motor 314' from the rest of the machine and move the take-up assembly away as a unit. No system of clutches as previously described is necessary.

It is of course to be understood that upon the reversal of the direction of film movement, the toothed feeding members and other film engaging elements and the light sources and light responsive cell will be operated as previously described in connection with Figure 7, through the operation of solenoids 115" and 116". These solenoids may be controlled in any desired way as previously described. At this time, it is of course necessary to reverse the direction of the motors 314 and 314'.

Means for reversing these motors are shown in Figure 32. A reversing switch 381 for the two motors is operated through linkage generally shown as 382 by a control shaft 112", corresponding to shaft 112, which in turn is operated through linkage 383 by the solenoids 115" and 116". Link 113" controls the various elements in the projecting and sound heads as previously stated.

Under certain conditions it is desirable to control the speed of the two carriers directly by means of rheostats. In view of the great reduction in speed between the driving motors for the individual carriers and the carriers, the amount of power wasted by this method is little, and the operation is sufficiently sensitive. Figure 18 shows this exemplification of our invention.

A driving motor M' through a worm 401 and a worm wheel 402 may drive a control shaft 403. The motor M' through the connecting gears 405 may drive the shaft 406 which corresponds to the connective mechanism shown generally as 373 in Figure 15 and the shaft 240 of Figure 6.

The control shaft 403 through a worm 408, worm wheel 409, pinion 410, and gear 411 drives a shaft 412 which supports cams 415 and 416 which correspond to the cams previously described. A cam follower 418 is mounted on a short lever 419 to which is attached or with which there is integrally formed a long lever 420. To maintain the cam follower in relation to the surfaces of the cam, a lever arm 421 extends from a pivot point 422 and is moved downwardly as viewed in Figure 18 as by a spring 423. The upper portion of the arm 420 as viewed in the drawings is formed as or supports a wiper element which cooperates with a rheostat 425. The wiper arm and rheostat are respectively attached to leads of a circuit 426 which controls the motor 427 which through suitable and conventional gear reduction drives the delivery carrier. It will, therefore, be understood that the revolution of the cam 416, which is in direct relation to the feeding of the film through the apparatus, will be effective for controlling the speed of operation of the delivery carrier so that the lineal speed of the film will always be uniform, as at 90 feet per minute.

Similar control mechanism may be provided in connection with the cam 415 which controls the take up carrier. A cam follower 428 may be attached to a short arm 429 of a lever structure which includes a long arm 430 and a short extension 431 from the pivot point 432, spring 433 being operative to maintain the follower in contact with the cam surface. Formed in or supported by the long lever 430 is a wiper arm which cooperates with a rheostat 435. A circuit 436 operates a motor 437 which drives the take-up carrier in accordance with the amount of current delivered thereto from the rheostat which in turn, as has been previously described, is operated in accordance with the feed of the film through the projecting and sound heads of the apparatus.

Motors 427 and 437 are reversed, in the manner previously described in connection with motor 314 and 314'. The operable elements of the sound and projection heads may be similarly controlled.

As previously stated, we do not limit ourselves to any particular means for timing the intervals between the projecting and rewinding cycles.

Under certain conditions, however, it may be desirable to utilize a novel timing device which is definitely articulated with the control mechanism which determines the speed at which the two carriers are driven. Such mechanism is shown in Figures 23, 24 and 25.

Two control cams 461 and 462, of the type previously described, may be mounted for revolution with a shaft 463 as by clamps 465 which correspond to the clamp 291 of Figures 19 and 20. Follower cams, which control the speed of movement of both carriers as previously described, may be employed. The movement of the cam 461 may be utilized to open and close a circuit 467 (Figure 25) to a solenoid 115' which corresponds to the solenoid 115 of Figure 9 and the other figures. A similar circuit 489 may be used to control solenoid 116' by means of the movement of the cam 462.

Cam followers, corresponding to cam followers 418 and 428 and 161 and 174, previously described, are omitted from Figures 23 and 24 for clarity. Mounted to be positioned adjacent the high point of the cam 461 is a structure combining a contact finger 468 and a cam surface 469. The contact-making finger 468 may engage a contact 470 set in a depression formed in a fibre block 471 which is mounted upon an arm 472 which is hingedly connected to a collar 473 which encircles a hub 475. Tightening screws 474 may be employed to bind the collar against the hub. This hub is supported as upon a bearing mounted upon a fixed bracket 476.

In order to make it easy for the operator to reestablish the timing between the arm 472 and the cam 461 in the resetting of the cam, a pin 477 extends from a leaf spring 478 which is mounted upon the arm 472 and extends through a suitable opening in that arm toward the cam 461. In resetting the cam, the operator will loosen the clamp 465 and the screws 474 and pinch the leaf spring 478 and the cam 461 together, thus forcing the end of the pin 477 into a detent socket 479 therefor formed in the cam. Thereupon, he can rotate the two together. After he has tightened the respective clamps, he releases the spring which thereupon removes the pin from the detent socket, and relative movement between the cam and the arm 472 will again be possible.

A similar construction may be employed for the cam 462. An arm 481 may be hingedly mounted upon a collar 482 and carry a leaf spring 483 with its appropriate pin, the cam being supplied with a contact point 484 and a camming surface 485 and the arm 481 being supplied with a contact socket 486 into which the contact point 484 fits. The contact point 484 and the contact socket 486 through the circuit 489 control the solenoid 116'.

That conflict between the contact point of the cam and the contact arm may not result on the reverse movement of each of the cams, the combined contacting and cam structures formed upon the cams 461 and 462 are provided with cam or sloping surfaces 469 and 485 so that upon the reverse movement of each cam the contact arm is cammed out of the plane of the cam so that there is no conflict. This operation is clearly seen in Figure 23 in which arm 481 is shown sliding under the cam 462. The springs 480 and 487 will be effective to return the arms 472 and 481 to operative position.

As will be readily understood from the foregoing description, as the operating cam 461 moves to the position shown in the drawings it will make contact and close the circuit 467 thereupon operating the solenoid 115' so that it will be effective to change the parts from the rewinding to the projecting positions. At the conclusion of the reverse movement, the operating cam 462 will cooperate with the contact arm 481 to operate solenoid 116' through the circuit 489, thereby changing the parts from projecting to rewinding position.

As previously stated, the control of the damping means already described as illustrative represents merely one preferred form. Another preferred form is shown in Figures 21 and 22 upon Sheet 8 and Figure 31 upon Sheet 3. The sound gate may include a fixed section 82' and a movable section 83' corresponding to and being controlled as are the gate sections 82 and 83, as shown in Figures 7 and 8. From the aperture here formed the film f may extend downwardly as viewed in Figure 21 and around and about a roller 501 mounted loosely as upon a shaft 502, with a collar to limit movement to the right as shown in Figure 22. The film may thereupon be led over rollers 503 and into a throat 109' of a take up carrier. In order to serve as a "ripple killing" device, that is to say, to give absolute uniformity to the movement of this film as it passes the sound aperture, a large and relatively heavy flywheel 504 may be employed. A roller 505, mounted as upon the end of a pivoted arm 506, which is urged toward the film and the roller 501 by a spring 507, may hold the film against the roller. Such a device, if the flywheel 504 were rigidly connected to and revoluble with the film engaging roller 501, would be known in the art. In order to remove the damping effect of the flywheel as during the rewinding operation, to render threading more easy, and for other purposes, we supply means for clutching and declutching the flywheel and film engaging roller.

Mounted upon the shaft 502 we supply a clutch collar 508 with pins 509 extending through appropriate openings in the flywheel 504 and engageable with suitable openings in the film engaging member 501. A yoke 511, as is best seen in Figure 31, through pins which engage with a slot 513, is effective to move the clutch collar along the axis of the shaft 502. As will be readily apparent, such movement to the right as viewed in Figure 22 will be effective for operatively joining the flywheel and the film engaging member while movement to the left will disengage the two. The yoke 511 may be mounted upon a shaft 514 which is appropriately mounted upon the apparatus. To move the yoke, a pin 515 is fixed thereto and operates in a cam slot 516 which is cut in the control member 107' of Figure 31 which otherwise exactly corresponds to and is operated as the control member 107 of Figures 7 and 8. It will thus be seen that the movement of the control member 107 or 107' by the control member 58 which is operated by the solenoids 115 and 116 will be effective to render the damping means effective and ineffective in timed or sequential relation to the starting and stopping of all the other operable elements of the entire apparatus.

At many points in this description for purposes of illustration we mention the controlling element of one modification of our invention as cooperating with the controlled element of a specified modification thereof. For example, in the immediately foregoing portion of this description we state that the control member 58 may be operated by the solenoids 115 and 116. It will be readily understood, however, that such control member may be equally well operated as by the solenoids 115' and 116' or by the electrical or mechanical timing devices of the previously mentioned Proctor or Foster patents or applications or otherwise. We wish it definitely understood, that we in no way are limiting ourselves to any specific combination or combinations between the corresponding elements of the various modifications or species of our invention.

As previously described, in the loading or unloading process we may choose bodily to move our take up carrier to a separate loading machine which preferably is located in a fire-proof room other than the booth. A complete take up carrier unit is seen in Figure 1 as locked into position with such a loading and unloading machine 522. The films to be loaded are fed from a separate fire-proof compartment 523 to the take up carrier 13 such feeding mechanism and the feeding mechanism of the carrier being controlled in common. As clearly seen in the drawings, the loading machine is provided with a deep recess into which a portion of the carrier may be inserted. Similarly, during the unloading process, the film is fed from the take up carrier 13 to a reel journalled in the fire-proof compartment 523, the take up carrier itself preferably being driven during this process. As later described, we employ mechanism which automatically stops the film when it reaches a predetermined point such as the end of a reel. Since loading machines of the stationary and portable type are very similar, we are describing in detail only the portable type. The following description of that type, which is shown in Figure 2, applies equally well, except for a few obvious minor differences, to the fixed type shown in Figure 1.

Under certain conditions, as previously stated, we prefer to move a special loading machine 525 to the take-up carrier 13 rather than moving the take-up carrier along the track 35 to the stationary machine. The loading machine 525 may be mounted as upon casters 526 so that it can be readily moved to whatever position is desirable. Two film magazines are provided, 527 and 528, each constructed in the manner shown in Figure 3. Journalled in a bearing in a rearward fixed side 530 of the magazine and in another bearing in the openable door 531 of the opposite side, is a shaft 533 upon which the film reels 534 are placed while the machine 525 is outside of the operating booth. To move the reels transversely of the shaft 533 a comb device is provided which consists of a rotatable tube 534 mounted upon a transverse shaft 535 and suitably journaled in the opposite sides of the compartment 527. This tube 534 projects forwardly out of the casing and has upon the end so projecting a handle 536. Extending in a direction normal to the tube 534 are fingers or teeth 537 which are separated a sufficient distance apart so that the various reels 539 may be placed upon the central spindle 533 and separated by these fingers. By reason of this construction it will be evident that when the tube 534 is pulled to the right as viewed in Figure 3 the teeth 537 will move the reels 539 to the right, thus placing one after another in the position adjacent the right end of the shaft 533 and in line with the film handling mechanism later to be described. Contrary movement of the rod 534 will accomplish a contrary result. That access may be gained to the compartment 527 the side 531 is hinged at 540 to form a door and is provided with a latch 541. To drive the spindle 533 a pulley 543 is affixed to one end thereof and a hand crank 544 by means of a split shaft is operably connected to the other end.

Opposite the reel positioned nearest the door 531, a fire trap 546 and an appropriate opening are provided. In line with this opening are a first film supporting unit comprising rollers 547 and 548, a second film supporting unit comprising a sprocket 549 and idler 550 and a third supporting unit comprising rollers 551 and 552. These several units including suitable standards are attached to a table-like surface 553 of the loading mechanism 525. When it is desired to move a film from or to the lower magazine 528 of the loading mechanism, the film is drawn through a fire trap 555, through an appropriate opening, between the rollers 556, and over the roller 557 suitably supported above the table 553 and thereunto through the path previously described.

To drive the reels 539 in a re-winding direction, the motor 561 is supplied which through a one-way friction pulley device 562 of standard construction and the pulleys 563 and appropriate belts drives the pulleys 543 which drive the shafts 533 and hence revolve the reels in a re-winding direction.

In order to stop the movement of the film in either direction when the film is exhausted from what is then its delivery carrier, automatic mechanism is provided. This mechanism comprises a roller 565 mounted upon a weighted arm 566 which is pivoted upon a support 567 upon the table 553. Depending from this arm 566 is link 568 which through an arm 569 operates a switch 570, which switch controls both the circuit to the motor 561 of the film loading mechanism and the circuit to the motor, as 314', which operates the take-up carrier, 13, such operation of the take-up carrier being either in the projecting direction as when the take-up carrier 13 is being loaded or in the re-winding direction as when the carrier 13 is being unloaded and the reels 537 being loaded for return to the film exchange.

A latch 575 may lock the carrier and take up machine together. A footage recording device 576 may be operated by the sprocket 549.

The operation of our loading mechanism is as follows:

The operator, in a room other than the projection booth, opens the door 531 and places 10 or any other desired number of full reels of film, after he has removed the bands therefrom, just as they come from the film exchanges in each magazine upon its shaft. According to the present practice these reels will be wound leading end foremost ready for projection, that is to say, ready for winding up upon the take-up reel whether through the projecting machine or otherwise. He then closes the door 531 and moves the loading mechanism into engagement with the take-up mechanism of the projector which he wishes to load or vice versa. He connects one lead from the electric main to the loading mechanism and another lead back to the take-up carrier, the take-up carrier in this illustration of our invention preferably being of the type illustrated in Figure 15. He thereupon threads the leading end of the film which is carried by the first or outermost reel through the opening 546 between the various paired rollers in line therewith, under the roller 565, and fastens it to the outward end of a tape 581, which is attached to a pin 583 which works in slots in side plates 579 of the carrier and may extend into an appropriate recess in a large hub 585 of the carrier. This latter construction may be as described and claimed in Patents Numbers 1,871,234 and 1,871,237 both dated August 9, 1932, to Barton Allen Proctor. Or any other desired means of attaching may be used. He thereupon through the switch 572, starts the motor 314' of the take-up carrier, the mechanism being so set that it operates in a feeding direction. The film is thereupon drawn about the core 585 of the take-up carrier. The operator in the conventional way examines the film as it passes between the rollers 550 and 552 and if he detects a portion in bad condition he breaks the circuit to the motor 314', and makes the necessary repairs. He has place in which to work between the standards for the roller 550 and 552. As the first reel of the program is exhausted and its trailing end passes from between the rollers 547 and 548, the weighted roller 565 falls, and, through the link previously described, cuts the circuit to the motor for the take-up carrier and stops the feeding of the film. The operator notes the footage whihch has been wound off the first reel, and, by the handle 536 moves all of the reels to the right as viewed in Figure 3 and the second reel into position opposite the opening 546. He thereupon attaches the leading end of the second reel to the trailing end of the first reel and proceeds as before, placing the empty first reel in compartment 577. He proceeds in this manner until all the reels in the upper and lower magazines 527 and 528 have been wound upon the take-up carrier 13.

The operator goes through a similar procedure when he unloads the take-up magazine. He again pushes the loading machine into operative relation with the take-up magazine and threads the trailing end of the film from the take-up carrier back through the various paired rollers and under the control roller 565 and attaches it to an empty reel placed at the right hand side of either compartment. He thereupon starts the motor 561 of the loading machine and motor 314', of the take-up carrier and the film is thereupon both forced and drawn in a rewinding direction upon this empty reel. It will be understood that the motor 561 of the loading machine is driven at such speed that the empty reel 539 would be normally revolving at a sufficient speed to draw the film at a speed higher than that at which it is being delivered by the operation of the motor of the take-up carrier 13. Because of the slippage through the friction disc indicated at 562 the effect of this higher speed is merely to maintain the film taut at all times.

The registering device 576, operated by the toothed roller 549, indicates the footage which has been drawn off so that at the appropriate time the operator may stop the film and disengage what was originally the last reel from the remainder of the film which remains upon the take-up reel. He then opens the door 531 of the compartment 527 or 528 and removes the full film, immediately, however, placing it in one of the fire-proof compartments 577 of the loading magazine. He continues in this manner until all of the film upon the take-up carrier has been removed and rewound upon the separate reels ready for return to the film exchange.

If the operator wishes to move the film slightly in one direction or the other for patches or any other reason he can do so by hand either through the handle 544 or through manual movement by means of a handle supplied for the take-up carrier 13.

As previously stated, during the loading operation, when the operator reaches the end of each first reel, he may record its footage so that during the following unloading operation he may know the point at which to stop the winding of the film back from the take up carrier of the projector to the reel which is to be returned to the film exchange. Alternatively automatic mechanism may accomplish the same result. In the manner previously described, during the loading operation the film movement is stopped at the end of each reel. The point of such stopping may be registered by the footage responsive device. On the return movement of the film, after the showing has been completed, the mechanism 576 may automatically operate through the switch 570 to stop the motor 561 after an amount of film exactly that previously last reeled upon the take-up carrier has been rewound upon its reel for return to the film exchange. To save complication and expensive machinery, we prefer to have the operator merely record the footage of the various reels during the loading operation and then by hand set this mechanism to operate automatically at the proper point during the rewinding operation, but if desired this operation can be entirely automatic, the mechanism setting itself during the loading operation for operation at the proper point during unloading.

Bottles 591 containing fire extinguishing gases, or liquids which produce such gases, with fusible stoppers are provided for the various compartments of the loading mechanism. Such flasks are also supplied—see Figure 5—for the take-up carrier and, not shown, for the delivery carrier. A control element 592 may also be provided to release the gas should the heat in the head exceed a predetermined minimum or should the film break. In this latter case, the element 592 is connected to and operated by any appropriate device, such as the arm 354 or 354' of Figures 26 and 27 respectively.

It is believed that the operation of all parts and phases of the invention will be clear from the foregoing description, but a short résumé of certain aspects of it may be useful.

Prior to the loading operation or unloading operation, to which reference has been made above, it is of course necessary in any exemplification of our invention to render the delivery carrier and the head inoperative both to save wear and avoid interference with the timing. In purely mechanical forms of our invention this result is obtained by the downward movement of the control handle 264 in Figure 11 which declutches the delivery operating shaft 144 and the head operating shaft 240 and simultaneously operates the clutches 189—190 and 205—206, best shown in Figures 13 and 14, to render the high speed take up drive operative and the low speed take up drive inoperative. Simultaneously the rewind drive, if it should happen to be in operative position, will be declutched. It will be understood that at this point in the cycle of operations the film previously upon the delivery carrier will have been completely fed to the take up carrier and consequently the cam follower 161 will be in the zero or empty-reel relation to the cam 162 which controls the delivery carrier. It will be understood that the downward movement of the handle 264, previously described, will have been effective for declutching the delivery cam and its follower from the driving shaft.

In the following unloading operation the cam follower 174 for the cam 175 will move back to the zero or empty-reel position. During this unloading operation the cam and follower for the delivery carrier remain in the zero position. In the subsequent loading operation the cam and follower for the take up reel move to the proper position as indicated for the end of the particular film which is being wound upon the take up carrier. If, for example, the program consists of 18,000 feet, the cam for the take up carrier will be at the position for such footage when the film is completely wound upon the take up carrier. During this winding up or loading operation the cam and follower for the delivery carrier will have remained in the zero position.

In case any form of the invention shown in Figures 15 or 18 is employed, the take up carrier unit is operatively separated from the rest of the machine by changing the lead of the motor 314' or 437 respectively from the body of the apparatus to the loading machine. It will be understood that such break occurs after the film is all upon the take up reel so that the delivery carrier cam will be at the zero or empty carrier position in case the form shown in Figure 18 is used.

After the take up carrier has been loaded, it is necessary to rewind the film into the delivery magazine. The operator through the use of handle 264 will reset the mechanism, if it is of the Figure 11 type. If of the other types, he will merely re-attach the leads to the projector.

By use of the handle 295 he will place the apparatus in rewinding position, so far as the clutches are concerned, but will not start the motor or motors until he has fastened the trailing end of the film to the delivery carrier. At that point he will re-start the machine and the rewinding operation will be automatically carried out. At the conclusion of the rewinding operation as, for example, by the signaling means shown in Figure 9, the rewinding operation will be concluded and the projecting operation re-started. At this point of change of cycles the cam and follower for the take up carrier will have gone back again to the zero position and the cam and follower for the delivery carrier will have reached their maximum position. It will therefore be understood that if the cycle of operation is carried out as we prefer, no handsetting of the cams will be necessary.

In the forms of our invention in which the film itself determines the speed of the two carriers no question of adjustment arises.

Throughout this description the invention has been described as applied to a projecting apparatus. It will be readily understood, however, that in such cases as it is desired to expose or to print a large amount of film, the invention is equally applicable. The invention also has many other uses.

Various of the advantages of our invention will be evident from the foregoing description, the attached drawings and the subjoined claims. Other advantages are those which arise from an improved method and automatic machines for presenting an entire evening's motion picture program as a unit, with an increase in the safety of the public, a decrease in the time and skill required in operation and better results upon the screen.

We claim:

1. In a film handling apparatus, a rotatable delivery carrier, a continuously driven delivery feeding member, an intermittently driven member engaging the film adjacent said delivery member to which intermittent member the delivery member advances the film, driving means for continuously rotating said delivery carrier at such rate that it continuously delivers film to said delivery member whereby said delivery member merely advances the film from the delivery carrier toward the intermittent carrier without revolving the delivery carrier through tractive effort upon the film, and means engaging the film on said delivery carrier for determining the rate of rotation of said delivery carrier.

2. In a film handling apparatus, a delivery carrier and a take-up carrier between which a film extends, a projection head disposed between said carriers, said projection head including an intermittent feeding member, a continuously operating delivery member which advances film from the mass supported upon said delivery carrier to said intermittent member, and a continuously operating taking up member which advances the film from said intermittent member toward said take-up carrier, means for driving said projection head, a motor, independent of said driving means, for driving said delivery carrier in a feeding direction, and means for varying the current reaching said motor at such rate that the lineal speed of the film delivered by said carrier is maintained substantially the same as that of said delivery member.

3. In a film handling apparatus, a delivery carrier and a take-up carrier between which a film extends, a projection head disposed between said carriers, said projection head including an intermittent feeding member, a continuously operating delivery member which advances film from the mass supported upon said delivery carrier to said intermittent member, and a continuously operating taking up member which advances the film from said intermittent member toward said take-up carrier, means for driving said projection head, a motor, independent of said driving means, for driving said delivery carrier in a feeding direction, and cam means driven in time to the operation of said delivery member for varying the current reaching said motor at such rate that the lineal speed of the film delivered thereby is maintained substantially the same as that of said delivery member.

4. In a film handling apparatus, a delivery carrier and a take-up carrier between which a film extends, a projection head disposed between said carriers, said projection head including an intermittent feeding member, a continuously operating delivery member which advances film from the mass supported upon said delivery carrier to said intermittent member, and a continuously operating taking up member which advances the film from said intermittent member toward said take-up carrier, means for driving said projection head, a motor, independent of said driving means, for driving said delivery carrier in a feeding direction, means for varying the current reaching said motor at such rate that the lineal speed of the film advanced by said carrier is maintained substantially the same as that of said delivery member, and mechanism for controlling said current varying means, said control mechanism including an actuating member engaging the film between said delivery carrier and said delivery member.

5. In a film handling apparatus, an intermittently operating feeding member, a continuously operating take-up sprocket to which said intermittent feeding member advances the film and for moving it therefrom, means including a prime mover for driving said intermittent feeding member and said take-up sprocket, a take-up carrier for continuously winding up the film moved by said take-up sprocket, and separate means for continuously driving said take-up carrier, said separate driving means including a second prime mover, and means for governing the speed at which said prime mover drives said take-up carrier in step with the peripheral speed of said take-up sprocket.

6. In a film handling apparatus, a delivery carrier, a continuously driven delivery feeding member associated with said delivery carrier for advancing film supported upon said delivery carrier, an intermittently driven feeding member, to which said delivery member advances the film, for further advancing the film, a continuously driven take-up feeding member, to which said intermittently driven feeding member advances the film, for further advancing the film, a take-up carrier for winding up the film so advanced, means for driving said feeding members and said take-up carrier in a feeding direction, mechanism operatively interconnected with said driving means for governing the speed of operation of said take-up carrier so that its peripheral speed is substantially the same as that of said continuous taking up feeding member, said governing means including a cam, means for driving said cam in time to the operation of said take-up feeding member, means connecting said driving means and said take-up carrier, a follower for said cam, and a connection between said follower and said connecting means for modifying said connecting means by the position of said follower.

7. In a film handling apparatus, a delivery carrier and a take-up carrier between which a film extends, toothed feeding members positioned between said carriers for engaging the film and advancing it from said delivery carrier toward said take-up carrier, means for driving said toothed members and said take-up carrier in a feeding direction, said driving means including a first clutch for said toothed members and a second and separate clutch for said take-up carrier, and control mechanism interlocking said clutches, said control mechanism including devices for substantially simultaneously rendering both of said clutches operative to transmit the power of said driving means, whereby said toothed members and said take-up carrier are both driven by said driving means, and alternatively operable devices for rendering said second clutch operative to transmit such power whereby said take-up carrier is operated by said driving means in a feeding direction and said toothed members are not operated.

8. In a film handling apparatus, a delivery carrier and a take-up carrier between which a film extends, toothed feeding members positioned between said carriers for engaging the film and advancing it from said delivery carrier toward said take-up carrier, means for driving said toothed members and said take-up carrier in a feeding direction, said driving means including a first clutch for said toothed members and a second and separate clutch for said take-up carrier, a third or rewinding clutch for connecting said delivery carrier with said driving means for driving said delivery carrier in a rewinding direction, and control mechanism interlocking said three clutches and including devices for rendering said first and third clutches inoperative to transmit the power of said driving means and rendering said second clutch operative to transmit the power of said driving means thereby operating said take-up carrier in a feeding direction by said driving means while maintaining said delivery carrier and said toothed feeding means inoperative.

9. In a film handling apparatus, a delivery carrier, a continuously operating delivery feeding member for advancing film from the mass supported upon said delivery carrier, an intermittently operating feeding member, to which said delivery member advances film, means for driving said feeding members and said delivery carrier in a feeding direction, timing mechanism associated with said delivery carrier for driving said delivery carrier at a constantly changing speed and at such speed that it delivers film at the same lineal speed as that of said delivery feeding member so that it continuously delivers film thereto thereby not requiring said continuous delivery member to exert tractive effort upon said carrier through the film extending therebetween, and means for disconnecting and reconnecting said delivery carrier and said driving means without disturbing said timing mechanism.

10. In a film handling apparatus, a delivery carrier and a take-up carrier between which a film extends, toothed film feeding means disposed between said carriers and engaging the film, means for driving said toothed members and said take-up carrier in a feeding direction whereby the film is fed from said delivery carrier toward said take-up carrier and wound thereupon, means for creating a cleared channel between said carriers unimpeded by the teeth of said toothed members, powered mechanism for driving said delivery carrier in a rewinding direction whereby the film is moved through said cleared and unimpeded channel and wound upon said delivery carrier, and timing means governing said rewinding driving mechanism for operating said rewinding driving means at a substantially uniform speed whereby said rewinding operation is carried out at a uniform speed, irrespective of the constant change in the mass of film upon said delivery carrier, so that, with no sacrifice in the time consumed in the rewinding operation, the film and the apparatus are freed from the strain of the conventional high speed and high momentum of the delivery carrier during the concluding portion of the rewinding operation.

11. In a film handling apparatus, feeding means including a toothed member for advancing a film, a carrier for taking up the film advanced by said feeding means, a first mechanism operatively interconnected with said feeding means for driving said take-up carrier at a relatively low speed during the operation of said film feeding means and in synchronism therewith, a second mechanism for driving said take-up carrier at a relatively high speed so that a film may be initially loaded thereupon, and control means operatively interconnecting said feeding means and said first and second mechanisms and including devices for rendering said feeding means and said first mechanism operative and said second mechanism inoperative and for rendering said feeding means and said first mechanism inoperative and said second mechanism operative.

12. In a film handling apparatus, a delivery carrier, a take-up carrier, toothed members for feeding a film supported upon said delivery carrier to said take-up carrier, driving mechanism, a first means for connecting said take-up carrier and said driving mechanism for revolving said take-up carrier at low speed in a taking up direction, a second means for connecting said take-up carrier and said driving mechanism for revolving said take-up carrier at high speed in a taking up direction, means for connecting said delivery carrier to said driving mechanism for revolving said delivery carrier in a rewinding direction, and control mechanism operatively interconnecting all three of said connecting mechanisms and including control devices which necessarily render only one of said connecting means operative at one time.

13. In a film handling apparatus, a delivery carrier, a take-up carrier, means including toothed members for feeding a film supported upon said delivery carrier to said take-up carrier, driving mechanism, a first means for connecting said delivery carrier to said driving mechanism for revolving said delivery carrier in a projecting direction, a second means for connecting said take-up carrier to said driving mechanism for revolving said take-up carrier in said projecting direction at such speed that it receives and winds film at substantially the same lineal speed as that at which said delivery carrier delivers film under revolution by said first connecting means, a third means for connecting said take-up carrier to said driving mechanism for revolving said take-up carrier in said projecting direction at a greater number of revolutions per minute than that at which said delivery carrier is revolved by said second connecting means, and control mechanism operatively interconnecting said first, second and third connecting means and including devices for alternatively rendering said first and second means concurrently operative while maintaining said third means inoperative and for rendering said third means operative while maintaining said first and second means inoperative.

14. In a film handling apparatus, a delivery carrier and a take-up carrier between which a film extends, a continuously operating delivery feeding sprocket engaging and advancing the film supported by said delivery carrier, an intermittently operated feeding member which engages and advances the film fed by said delivery sprocket, a continuously operating take-up feeding sprocket engaging and advancing the film fed by said intermittent member toward said take-up carrier, a spindle for supporting said take-up carrier, an enclosure for said take-up carrier in which said spindle is journalled, a main driving mechanism, means for connecting said sprockets and said intermittent member and said take-up spindle with said main driving mechanism whereby said driving mechanism drives said sprockets and said intermittent member and said take-up carrier for the purpose of carrying out the regular projecting operation upon the film, means for detaching said spindle from operative connection with said main driving mechanism for the purpose of revolving said spindle in order to prepare for a regular projecting operation in said apparatus, means for detaching said enclosure from the remainder of said apparatus, a subsidiary driving mechanism spaced from said apparatus, said enclosure and said subsidiary driving mechanism being bodily movable one relatively to the other, and means for connecting said spindle and said subsidiary driving mechanism when moved into cooperative relation whereby said subsidiary mechanism drives said spindle.

15. For use with a film handling apparatus which includes a carrier and means for projecting a film wound upon said carrier, a loading machine separate from said apparatus and bodily movable in relation thereto; said loading machine including means for the support thereupon of a plurality of reels of film and fireproof enclosures for said support; means for detachably securing said loading machine and said carrier in assembled relation one to another; guiding surfaces for the film upon said machine, guiding surfaces for the film upon said carrier, and means for aligning said loading machine and said carrier so that said guiding surfaces of said machine and said carrier form a continuous guiding path for the film when said machine and carrier are in assembled relation one to the other and said carrier and said reel are disposed in close relation one to the other, means for successively bringing each of said plurality of reels into alignment with said guiding path, driving means on said film handling apparatus, driving means on said loading machine, means for actuating the driving means on the film handling apparatus to unwind film from said reels on said loading machine, or selectively for actuating the driving means on said loading machine to unwind film from the film handling apparatus.

16. In combination, a film handling apparatus and a loading machine for use therewith but separate therefrom; said film handling apparatus having a plurality of operable parts and including a delivery carrier and a take-up carrier between which a film extends, a spindle for said take-up carrier, mechanism for driving said take-up spindle and said other operable parts of said apparatus, an enclosure for said take-up carrier in which said spindle is journaled, and means for disconnecting said take-up spindle from the other operable parts of said apparatus leaving it free to spin, and means for driving said take-up spindle after it has been disconnected from said other operable parts of said apparatus; said loading machine and said enclosure for said take-up carrier being movable one in relation to the other, and being adapted to be positioned in alignment with each other; and said loading machine including a spindle supported thereon upon which a carrier may be mounted, means for disconnecting said spindle of said loading machine from its drive when said spindle of said take-up carrier is operated to wind the film thereupon; guiding surfaces disposed between said spindles for directing the film therebetween when said loading machine and said enclosure are disposed in alignment with each other, means for driving said spindle of the loading machine, and means for aligning said loading machine and said carrier so that said guiding surfaces of said machine and said carrier form a continuous guiding path for the film when said machine and said carrier are disposed in alignment with each other; whereby when said loading machine and said take-up enclosure are disposed in alignment with one another said take-up spindle may be disconnected from the other operable parts of said apparatus and a film wound upon said take-up carrier may be unwound therefrom and wound upon the spindle of said loading machine by the operation of said driving means of said loading machine, or alternatively the film may be wound from the spindle of said loading machine by the operation of the spindle of said enclosure.

WARREN DUNHAM FOSTER.
FREDERICK DAVENPORT SWEET.